(12) United States Patent
Dale et al.

(10) Patent No.: US 8,673,031 B2
(45) Date of Patent: Mar. 18, 2014

(54) PRETREATED DENSIFIED BIOMASS PRODUCTS

(75) Inventors: Bruce E. Dale, Mason, MI (US); Bryan Ritchie, Okemos, MI (US); Derek Marshall, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 5 days.

(21) Appl. No.: 13/202,011

(22) PCT Filed: Aug. 24, 2010

(86) PCT No.: PCT/US2010/046525
§ 371 (c)(1),
(2), (4) Date: Aug. 17, 2011

(87) PCT Pub. No.: WO2011/028543
PCT Pub. Date: Mar. 10, 2011

(65) Prior Publication Data
US 2011/0300269 A1    Dec. 8, 2011

Related U.S. Application Data

(60) Provisional application No. 61/236,403, filed on Aug. 24, 2009.

(51) Int. Cl.
*C10L 5/40* (2006.01)
*C10L 5/06* (2006.01)
*C10L 5/00* (2006.01)

(52) U.S. Cl.
USPC .................. 44/589; 44/593; 44/594; 44/595; 44/596; 44/605

(58) Field of Classification Search
CPC .......... C10L 5/44; C10L 5/445; Y02E 50/30; Y02E 50/10
USPC .................... 44/589, 593–596, 605
See application file for complete search history.

(56) References Cited

U.S. PATENT DOCUMENTS 4,064,276 A    12/1977    Conradsen et al.
4,263,744 A    4/1981    Stoller
4,370,351 A    1/1983    Harper
(Continued)

FOREIGN PATENT DOCUMENTS

AU        756976        11/2000
CA    2610797 A1    12/2006
(Continued)

OTHER PUBLICATIONS

International Application Serial No. PCT/US2010/046525, Preliminary Report on Patentability mailed Mar. 8, 2012.

(Continued)

*Primary Examiner* — Cephia D Toomer
(74) *Attorney, Agent, or Firm* — Clark IP Law, PLC

(57) ABSTRACT

A product comprising at least one densified biomass particulate of a given mass having no added binder and comprised of a plurality of lignin-coated plant biomass fibers is provided, wherein the at least one densified biomass particulate has an intrinsic density substantially equivalent to a binder-containing densified biomass particulate of the same given mass and h a substantially smooth, non-flakey outer surface. Methods for using and making the product are also described.

6 Claims, 6 Drawing Sheets

(56) References Cited

U.S. PATENT DOCUMENTS

| | | | |
|---|---|---|---|
| 4,526,791 A | 7/1985 | Young |
| 4,589,334 A | 5/1986 | Andersen |
| 4,600,590 A | 7/1986 | Dale |
| 4,848,026 A | 7/1989 | Dunn-Coleman et al. |
| 5,037,663 A | 8/1991 | Dale |
| 5,047,332 A | 9/1991 | Chahal |
| 5,171,592 A | 12/1992 | Holtzapple et al. |
| 5,370,999 A | 12/1994 | Stuart |
| 5,736,032 A | 4/1998 | Cox et al. |
| 6,106,888 A | 8/2000 | Dale et al. |
| 6,176,176 B1 | 1/2001 | Dale et al. |
| 6,524,848 B2 | 2/2003 | McNelly |
| 6,620,292 B2 | 9/2003 | Wingerson |
| 7,371,926 B2 | 5/2008 | Sticklen et al. |
| 7,494,675 B2 | 2/2009 | Abbas et al. |
| 7,494,792 B2 | 2/2009 | Warzywoda et al. |
| 7,585,652 B2 | 9/2009 | Foody et al. |
| 7,771,565 B2 | 8/2010 | Kirov et al. |
| 7,910,338 B2 | 3/2011 | Hennessey et al. |
| 7,915,017 B2 | 3/2011 | Dale |
| 8,367,378 B2 | 2/2013 | Balan et al. |
| 8,394,611 B2 | 3/2013 | Dale et al. |
| 2003/0044951 A1 | 3/2003 | Sporleder et al. |
| 2006/0130396 A1* | 6/2006 | Werner ........................ 44/590 |
| 2007/0031918 A1 | 2/2007 | Dunson, Jr. et al. |
| 2007/0037259 A1 | 2/2007 | Hennessey et al. |
| 2007/0192900 A1 | 8/2007 | Sticklen |
| 2007/0287795 A1 | 12/2007 | Huda et al. |
| 2008/0008783 A1 | 1/2008 | Dale |
| 2008/0256851 A1* | 10/2008 | Lumb ............................ 44/605 |
| 2008/0280236 A1* | 11/2008 | Wright ........................... 431/2 |
| 2009/0011474 A1 | 1/2009 | Balan et al. |
| 2009/0042259 A1 | 2/2009 | Dale et al. |
| 2009/0053770 A1 | 2/2009 | Hennessey et al. |
| 2009/0053771 A1 | 2/2009 | Dale et al. |
| 2009/0093027 A1 | 4/2009 | Balan et al. |
| 2009/0178671 A1 | 7/2009 | Ahring et al. |
| 2009/0318670 A1 | 12/2009 | Dale et al. |
| 2010/0159521 A1 | 6/2010 | Cirakovic et al. |
| 2010/0267999 A1 | 10/2010 | Lau et al. |
| 2011/0192559 A1 | 8/2011 | Venkatesh et al. |
| 2011/0201091 A1 | 8/2011 | Dale |
| 2012/0064574 A1 | 3/2012 | Tokuyasu et al. |
| 2012/0085505 A1 | 4/2012 | Sabourin |
| 2012/0125548 A1 | 5/2012 | Cohen |
| 2012/0125551 A1 | 5/2012 | Cohen et al. |
| 2012/0187228 A1 | 7/2012 | Camp et al. |
| 2012/0325202 A1 | 12/2012 | Dale |
| 2013/0196398 A1 | 8/2013 | Bals et al. |
| 2013/0217073 A1 | 8/2013 | Chundawat et al. |
| 2013/0247456 A1 | 9/2013 | Dale et al. |

FOREIGN PATENT DOCUMENTS

| | | |
|---|---|---|
| CA | 2752604 | 8/2010 |
| CA | 2573046 | 9/2010 |
| CA | 2762985 | 7/2013 |
| CA | 2 650 860 C | 9/2013 |
| CA | 2 737 704 C | 11/2013 |
| CN | 102597247 A | 7/2012 |
| CN | 102939388 A | 2/2013 |
| DE | 20301645 U1 | 4/2003 |
| EP | 0144930 A2 | 6/1985 |
| EP | 1247781 A2 | 10/2002 |
| GB | 1310835 A | 3/1973 |
| GB | 1381728 | 1/1975 |
| GB | 2122864 A | 1/1984 |
| IN | 249187 | 10/2011 |
| IN | 9645/DELNP2011 A | 2/2013 |
| JP | 2008-161125 A | 7/2008 |
| JP | 2008-535664 A | 9/2008 |
| JP | 2011160753 A | 8/2011 |
| RU | 2215755 C1 | 11/2003 |
| RU | 22157655 C1 | 11/2003 |
| WO | WO-8500133 | 1/1985 |
| WO | WO-8500133 A1 | 1/1985 |
| WO | WO-0061858 | 10/2000 |
| WO | 01/32715 A1 | 5/2001 |
| WO | 200237981 A2 | 5/2002 |
| WO | 20071005918 A2 | 1/2007 |
| WO | 2007/130337 A1 | 4/2007 |
| WO | 20081020901 A2 | 2/2008 |
| WO | 20081114139 A2 | 9/2008 |
| WO | 20081114139 A3 | 12/2008 |
| WO | 2010098408 A1 | 9/2010 |
| WO | 2010/121348 A1 | 10/2010 |
| WO | 20101135679 A1 | 11/2010 |
| WO | 2010147218 A1 | 12/2010 |
| WO | WO-2011028543 A2 | 3/2011 |
| WO | 2011/046818 A2 | 4/2011 |
| WO | 20111028543 A3 | 6/2011 |
| WO | 2011133571 A3 | 10/2011 |
| WO | WO-2011133571 | 10/2011 |
| WO | 2012012594 A1 | 1/2012 |
| WO | 20121071312 A2 | 5/2012 |
| WO | 20121088429 A2 | 6/2012 |
| WO | 2013106113 | 7/2013 |
| WO | 2013131015 | 9/2013 |
| WO | 20131163571 A2 | 10/2013 |

OTHER PUBLICATIONS

Candian Application Serial No. 2,760,840, Office Action mailed Mar. 28, 2012.

U.S. Appl. No. 12/976,344, Notice of Allowance mailed Mar. 27, 2012.

Carolan, Joseph E., et al, "Technical and Financial Feasibility Analysis of Distributed Bioprocessing Using Regional Biomass Pre-Processing Centers", Journal of Agricultural & Food Industrial Organization, vol. 5, Article 10, 2007; pp. 1-29.

"International Application Serial No. PCT/US10/46525, Search Report mailed Apr. 29, 2011", 5 pgs.

"International Application Sreial No. PCT/US10/46525, Written Opinion mailed Apr. 29, 2011", 4 pgs.

Adapa, P., et al., "Compression Characteristics of Selected Ground Agricultural Biomass", gricultural Engineering International: The CIGR Ejournal. Manuscript 1347. vol. XI., (Jun. 2009), 19 pgs.

Kaliyan, N, et al., "Roll Press Briquetting and Pelleting of Corn Stover and Switchgrass", Transactions of the ASABE. 52(2), (2009), 543-555.

Miller, Norman, "RE: Commitment Letter "Phase I Biomass Enhanced Refined Lignite Demonstration Project"", [Online]. Retrieved from the Internet: <URL: http://www.nd.gov/ndic/renew/meeting0903/r005-a-prop.pdf>, (Dec. 15, 2008), 24 pgs.

U.S. Appl. No. 11/729,632, Examiner Interview Summary filed Oct. 30, 2009.

U.S. Appl. No. 11/729,632, Non Final Office Action mailed May 6, 2009.

U.S. Appl. No. 11/729,632, Notice of Allowance mailed Nov. 16, 2009.

U.S. Appl. No. 11/729,632, Response filed Sep. 11, 2009 to Non Final Office Action mailed May 6, 2009.

U.S. Appl. No. 11/897,119, Restriction Requirement mailed Sep. 30, 2011.

U.S. Appl. No. 12/226,763, Final Office Action mailed Jan. 10, 2012.

U.S. Appl. No. 12/226,763, Non Final Office Action mailed Aug. 22, 2011.

U.S. Appl. No. 12/226,763, Response filed Dec. 21, 2011 to Non Final Office Action mailed Aug. 22, 2011.

U.S. Appl. No. 12/229,225 Response filed Nov. 15, 2011 to Non Final Office Action mailed Aug. 16, 2011.

U.S. Appl. No. 12/229,225, Final Office Action Mailed Jan. 6, 2012.

U.S. Appl. No. 12/229,225, Non Final Office Action mailed Aug. 16, 2011.

U.S. Appl. No. 12/229,225, Response filed Nov. 15, 2011 to Non Final Office Action mailed Aug. 16, 2011.

U.S. Appl. No. 12/286,913, Non Final Office Action mailed Mar. 1, 2012.

(56) References Cited

OTHER PUBLICATIONS

U.S. Appl. No. 12/286,913, Response filed Dec. 28, 2011 to Non Final Office Action mailed Sep. 28, 2011.
U.S. Appl. No. 12/976,344, Notice of Allowance mailed Feb. 23, 2012.
Canadian Application Serial No. 2,650,860, Office Action mailed Oct. 24, 2011.
Chinese Application Serial No. 200780025394.4, Office Action mailed Oct. 13, 2011.
European Applciation Serial No. 11162906.9, Office Action mailed Jan. 16, 2012.
European Application Serial No. 10778488.6, Office Action mailed Dec. 30, 2011.
Indian Application Serial No. 5933/CHENP/2008, Response filed Se. 14, 2011 to Office Action mailed Oct. 14, 2010.
International Application Serial No. PCT/US2007/010415, International Search Report mailed Oct. 11, 2007.
International Application Serial No. PCT/US2007/010415, Written Opinion mailed Oct. 11, 2007.
Chahal, D.S. "Bioconversion of Hemicelluloses into Useful Products in an Integrated Process for Food/Feed and Fuel (Ethanol) Production form Biomass", Biotechnology and Bioengineering Symp., No. 14, 1984; pp. 425-433.
Chang, Shu-Ting "The World Mushroom Industry: Trends and Technological Development", International Journal of Medicinal Mushrooms, vol. 8, 2006; pp. 297-314.
De Ferrer, et al "Sugar production from rice straw", Arch. Latinoam. Prod. Anim., vol. 5(Supl.1), 1997; pp. 112-114.
Lin, K., et al, "Pretreated Densified Biomass Products and Methods of Making and Using Same", Chemical Engineers Handbook, 5. Sup. Edition, Chapter 4, McGraw-Hill NY, 1973.
Mosier, et al "Features of promising technologies for pretreatment of lignocellulosic biomass" Bioresource Technology, vol. 96, 2005; pp. 673-686.
Teymouri, et al "Optimization of the ammonia fiber explosion (AFEX) treatment parameters for enzymatic hydrolosis of corn stover", Bioresource Technology, vol. 96, 2005; pp. 2014-2018.
U.S. Appl. No. 12/226,763, Notice of Allowance Mailed on May 29, 2012.
U.S. Appl. No. 12/226,763, Notice of Allowance Mailed on Oct. 1, 2012.
U.S. Appl. No. 12/791,703, Response Filed Oct. 11, 2012 for Office Action Mailed on Jul. 27, 2012.
Canadian Application No. 2,760,840, Office Action Mailed on Aug. 6, 2012.
Canadian Application No. 2,650,860, Office Action Mailed on Jun. 18, 2012.
Canadian Application No. 2,650,860, Response Filed on Apr. 23, 2012 to Office Action Mailed on Oct. 24, 2011.
Canadian Application No. 2,762,985, Office Action Mailed on Mar. 13, 2012.
European Application No. 07776479.6, Response Filed Sep. 30, 2012 to Office Action Mailed on May 30, 2012.
International Application No. PCT/US2011/066868; International Search Report Mailed on Sep. 19, 2012.
International Application No. PCT/US2011/066868; Written Opinion Mailed on Sep. 19, 2012.
Alizadeh, Hasan et al., "Pretreatment of Switchgrass by Ammonia Fiber Explosion (AFEX)", Applied Biochemistry and Biotechnology, vol. 121-124, 2005, 9pgs.
Deshusses, Marc A., "Biological Waste Air Treatment in Biofilters", Environmental Biotechnology, vol. 8, 1997, 335-339.
Kumar, Parveen et al., "Methods for Pretreatment of Lignocellulosic Biomass for Efficient Hydrolysis and Biofuel Production", Industrial & Engineering Chemistry Research, Mar. 20, 2009, 18pgs.
Perry, John H. "Reactor Design", Chemical Engineers Handbook, 6pgs.
Sheridan, B.A. et al., "Assessment of the Influence of Media Particle Size on the Biofiltration of Odorous Exhaust Ventilation Air From a Piggery Facility", Bioresource Technology, vol. 84, 2002, 129-143.

"Topic 3 R&D on Processes for Solid, Liquid and Gaseous Fuels From Biomass", 20th EU BC&E.
Zhang, Xianglan et al., "The Effect of Different Treatment Conditions on Biomass Binder Preparation for Lignite Briquette", Fuel Processing Technology, vol. 73, 2001, 186-196.
U.S. Appl. No. 12/226,763, Notice of Allowance Mailed on Jan. 22, 2013.
U.S. Appl. No. 12/763,102, Office Action Mailed on Dec. 24, 2012.
U.S. Appl. No. 13/202,011, Response Filed Dec. 21, 2012 for Office Action Mailed on Sep. 27, 2012.
Canadian Application No. 2,737,704, Response Filed Jan. 30, 2013 for Office Action Mailed on Nov. 5, 2012.
Canadian Application No. 2,760,840, Office Action Mailed on Jan. 3, 2013.
European Application No. 10814256.3, Extended European Search Report Mailed on Jan. 23, 2013.
Eggeman, Tim et al., "Process and Economic Analysis of Pretreatment Technologies", Bioresource Technology, vol. 96, 2005, pp. 2019-2025.
Kim, Sehoon et al., "Lime Pretreatment and Enzymatic Hydrolysis of Corn Stover", Bioresource Technology, vol. 96, 2005, pp. 1994-2006.
Kim, Tae Hyun et al., "Pretreatment and Fractionation of Corn Stover by Ammonia Recycle Percolation Process", Bioresource Technology, vol. 96, 2005, pp. 2007-2013.
Laureano-Perez, Lizbeth et al., "Understanding Factors That Limit Enzymatic Hydrolysis of Biomass", Applied Biochemistry and Biotechnology, vol. 121-124, 2005, 19 pgs.
Liu, Chaogang et al., "Partial Flow of Compressed-Hot Water Through Corn Stover to Enhance Hemicelllulose Sugar Recovery and Enzymatic Digestibility of Cellulose", Bioresource Technology, vol. 96, 2005, pp. 1978-1985.
Mosier, Nathan et al., "Optimization of pH Controlled Liquid Hot Water Pretreatment of Corn Stover", Bioresource Technology, vol. 96, 2005, pp. 1986-1993.
Wang, Lin et al., "Cost Estimates and Sensitivty Analyses for the Ammonia Fiber Explosion Process", Applied Biochemistry and Biotechnology, vol. 70-72, 1998, 16 pgs.
Wyman, Charles E. et al., "Comparative Sugar Recovery Data From Laboratory Scale Application of Leading Pretreatment Technologies to Corn Stover", Bioresource Technology, vol. 96, 2005, pp. 2026-2035.
Wyman, Charles E. et al., "Coordinated Development of Leading Biomass Pretreatment Technologies", Bioresource Technology, vol. 96, 2005, pp. 1959-1966.
Canadian Application Serial No. 2,760,840, Response filed Jun. 27, 2012 to Office Action mailed Mar. 28, 2012, 5 pgs.
Wilson, Jonathan, "A Cost Analysis for the Densification and Transportation of Cellulosic Biomass for Ethanol Production", Thesis for Department of Grain Science and Industry, 86 pgs., 2011.
Mangold, Ernst, "Archives of Animal Nutrition", Arch. Tierernahr., vol. 30, (1980),1-12, 1-864.
Adapa, Phani et al., "Pelleting Characteristics of Selected Biomass With and Without Steam Explosion Pretreatment", Int. J. Agric. & Biol Eng, vol. 3, No. 3, (Sep. 2010), 62-79.
Kumar, Linoj et al., "Does Densification Influence the Steam Pretreatment and Enzymatic Hydrolysis of Softwoods to Sugars?", Bioresource Technology, (2012), 38 pgs.
Theerarattananoon, Karnnalin et al., "Effects of the Pelleting Conditions on Chemical Composition and Sugar Yield of Corn Stover, Big Bluestem, Wheat Straw, and Sorghum Stalk Pellets", Bioprocess Biosyst Eng, vol. 35, (2012), 615-623.
Rijal, Binod, "Combined Effect of Pelleting and Pretreatment on Enzymatic Hydrolysis of Switchgrass", Bioresource Technology, vol. 116, (2012), 36-41.
U.S. Appl. No. 12/763,102 Response filed Mar. 25, 2013 to Office Action mailed on Dec. 24, 2012.
U.S. Appl. No. 12/976,344 Office Action mailed on Apr. 5, 2013.
U.S. Appl. No. 13/458,830 Preliminary Amendment filed Apr. 12, 2013.
U.S. Appl. No. 13/591,092 Response filed Mar. 13, 2013 to Office Action Mailed Dec. 13, 2012.
U.S. Appl. No. 13/591,092 Final Office Action mailed Mar. 25, 2013.

(56) References Cited

OTHER PUBLICATIONS

U.S. Appl. No. 13/591,092 Response to Provoke filed May 23, 2013.
U.S. Appl. No. 13/591,092 Advisory Action mailed Jun. 6, 2013.
Australian Application No. 2013205685 Supplemental Amendment filed Jun. 3, 2013.
Canadian Application No. 2,650,860 Notice of Allowance mailed on Apr. 2, 2013.
Canadian Application No. 2,650,860 Amendment after Allowance filed Jun. 13, 2013.
Canadian Application No. 2,650,860 Amendment after Allowance filed May 27, 2013.
Canadian Application No. 2,737,704, Office Action Mailed on Feb. 21, 2013.
Canadian Application No. 2,737,704, Response Filed May 21, 2013 to Office Action Mailed on Feb. 21, 2013.
Canadian Application No. 2,760,840 Response filed Mar. 28, 2013 to Office Action mailed on Jan. 3, 2013.
Canadian Application No. 2,760,840 Supplemental Amendment filed May 16, 2013.
Chinese Application No. 200780025394.4 Office Action mailed Mar. 27, 2013.
Chinese Application No. 200780025394.4, Response Filed Jun. 11, 2013 to Office Action Mailed Mar. 27, 2013.
Chinese Application No. 201110097994X Office Action mailed on Mar. 27, 2013.
European Application No. 11162906.9 Article 94(3) EPC mailed Mar. 3, 2013.
European Application No. 07776479.3 Response filed Apr. 5, 2013 to Office Action mailed Dec. 5, 2012.
European Application No. 07776479.3 EPC Rule 115(1) Summons to Oral Proceedings mailed on May 7, 2013.
Indian Application No. 110/DELNP/2012 Supplemental Amendment filed May 14, 2013.
MX/a/2011/012357 Office Action mailed on Mar. 13, 2013.
Chundawat, Shishir P.S. et al., "Multi-scale Visualization and Characterization of Lignocellulosic Plant Cell Wall Deconstruction During Thermochemical Pretreatment", Energy Environ. Sci, 2011, 4, 12 pgs.
Jin, Mingjie et al., Two-step SSCF to convert AFEX-treated switchgrass to ethanol using commercial enzymes and Saccharomyces cerevisiae424A(LNH-ST), Bioresource Technology 101, 2010, 8171-8178.
Kumar, Parveen et al., Methods for Pretreatment of Lignocellulosic Biomass for Efficient Hydrolysis and Biofuel Production, Ind. Eng. Chem. Res., Mar. 20, 2009, 18 pgs.
Lau, Ming W. et al., "Cellulosic Ethanol Production from AFEX-treated Corn Stover Using Saccharomyces cerevisiae.424A(LNH-ST)", PNAS, Feb. 3, 2009, vol. 106, No. 5, pp. 1368-1373.
Lau, Ming W. et al., "Comparing the Fermentation Peformance of *Escherichia coli* KO11, Saccharomyces cerevisiae 424A(LNH-ST) and Zymomonas mobilis AX101 for cellulosic ethanol production", Biotechnology for Biofuels, 2010, vol. 3 No. 11, 10 pgs.
Lau, Ming-Woei et al., "Ethanol Fermentation of *E. coli* K011 in Hydrolysate from AFEX-treated Corn Stover", Michigan State University, Department of Chemical Engineering and Material Sciences, date unknown.
"Lau, Ming W. et al., —The impacts of pretreatment on the fermentability of pretreatedlignocellulosic biomass: a.comparative evaluation betweenammonia fiber expansion and dilute acid pretreatment", Biotechnology for Biofuels, 2009, vol. 2 No. 30, 11 pgs.
"Marshall, S.P. et al., ""Complete Rations for Dairy Cattle. II. Sugarcane Bagasse Pellets as Roughage in Blended.Rations for Lactating Cows", Dairy Science Department, Universiry of Florida, 5 pgs, date unknown.
Rijal, Binod et al., "Combined Effect of Pelleting and Pretreatment on Enzymatic Hydrolysis of Switchgrass", Bioresource Technology, vol. 116, 2012, 36-41.
Rollin, Joseph A. et al., "Increasing Cellulose Accesibility is More Important Than Removing Lignin: A Comparison of Cellulose Solvent-Based Lignocellulose Fractionation and Soaking in Aqueous Ammonia", Biotechnology and Bioengineering, vol. 108, No. 1, Jan. 1, 2011, 9 pgs.
Roman-Ponce, H. et al., "Complete Rations for Dairy Cattle. V. Interaction of Sugarcane Bagasse Quantity and.Form with Soybean Meal, Urea, and Starea", Dairy Science Department, University of Florida, date unknown.
Singhania, Reeta Rani et al., "Advancement and Comparative Profiles in the Production Technologies Using Solid-State and Submerged Fermentation for Microbial Cellulases", Enzyme and Microbial Technology, vol. 46, 2010, pp. 541-549.
Sokhansanj, S. et el., "Biomass Densification—Cubing Operation and Costs for Corn Stover", Applied Engineering In Agriculture 20, 4, 495-499, date unknown.
Tabil, Lope et al., "Biomass Feedstock Pre-Processing—Part 1: Pre-Treatment", Biofuel's Engineering Process Technology, Aug. 2011, 411-437.
Teymouri, Farzaneh et al., "Optimization of the Ammonia Fiber Explosion (AFEX) Treatment Parameters for Enzymatic Hydrolysis of Corn Stover", Bioresource Technology, vol. 96, 2005, pp. 2014-2018.
Theerarattananoon, Karnnalin et al., "Effects of the Pelleting Conditions on Chemical Composition and Sugar Yield of Corn Stover, Big Bluestem, Wheat Straw, and Sorghum Stalk Pellets", Bioprocess Biosys Eng, vol. 35, 2012, pp. 615-623.
Wilson, Jonathon, "A Cost Analysis for the Densification and Transportation of Cellulosic Biomass for Ethanol Production", Kansas State University, Department of Grain Science and Industry, College of Agriculture, 2011, 86 pgs.
U.S. Appl. No. 13/997,043 Preliminary Amendment filed on Jun. 21, 2013.
U.S. Appl. No. 13/591,092 Request for Continued Examination with Amendment filed Jun. 25, 2013.
International Application No. PCT/US2013/028689 International Search Report and Written Opinion mailed on Jun. 4, 2013.
U.S. Appl. No. 12/763,102 Final Office Action mailed on Aug. 5, 2013.
U.S. Appl. No. 12/976,344 Response file on Sep. 5, 2013 to Non-Final Office Action mailed on Aug. 5, 2013.
U.S. Appl. No. 13/886,021 Preliminary Amendment filed Jul. 25, 2013.
Australian Application No. 2010249409 Amendment filed Aug. 28, 2013.
Australian Application No. 2010249409 Response filed Aug. 27, 2013 to Examination Report mailed on Aug. 30, 2012.
Australian Application no. 2011201768 Response filed Aug. 2, 2013 to Examination Report mailed on Jun. 21, 2012.
"Canadian Application No. 2737704 Supplemental Amendment filed Jul. 30, 2013".
"Canadian Application No. 2760840 Non-Final Office Action mailed on Jul. 30, 2013".
Chinese Application No. 200780025394.4 Office Action mailed on Jul. 26, 2013.
Chinese Application No. 201110097994X Response filed Jul. 11, 2013 to Office Action mailed on Mar. 27, 2013.
Chinese Application No. 201210287568.7 Office Action mailed on Jul. 26, 2013.
"European Application No. 10814256.3 EPC Article 94 (3) mailed on Sep. 6, 2013".
European Application No. 10814256.3 Response filed Aug. 7, 2013 for Office Action mailed Feb. 11, 2013.
European Application No. 11162906.9 Response filed Jul. 7, 2013 for Office Action mailed Mar. 6, 2013.
International Application No. PCT/US2011/066868 PCT Notice of Transmittal of IPRP mailed on Jul. 4, 2013.
International Application No. PCT1US2012/059898 PCT Notice of Transmittal of Int'l Search Report mailed on Jul. 26, 2013.
Eggeman, T., Boundary Analysis for H2 Production by Fermentation Jul. 2001-Sep. 2004, Subcontract Report NREL/SR-560-36129; Neoterics International, Lakewood, Colorado, National Renewable Energy Laboratory, Golden, Colorado, May 2005, 17 pgs.

(56) References Cited

OTHER PUBLICATIONS

Laureano-Perez, Lizbeth, etal., Understanding Factors that Limit Enzymatic Hydrolysis of Biomass, Applied Biochemistry and Biotechnology, vol. 121-124. pp. 1081-1099.

Sokhansanj, S., etal, Biomass Densification—Cubing Operations and Costs for Corn Stover, Applied Engineering in Agriculture—2004 American Society of Agricultural Engineers JSSN 0883-8542, vol. 20(4), 2005. pp. 495-499.

Zhu, et al., Concurrent Downflow Circulating Fluidized Bed (Downer) Rectors—A State of the Art Review, The Canadian Journal of Chemical Engineering, vol. 73, Oct. 1995, pp. 662-667.

Office Action received for European Patent Application No. 07776479.3, mailed on Dec. 5, 2012, 4 pages.

Office Action received for European Patent Application No. 11772569.7, mailed on Nov. 30, 2012, 2 pages.

Notice of Allowance received for U.S. Appl. No. 12/286,913, mailed on Oct. 3, 2012, 5 pages.

Non Final Office Action received for U.S. Appl. No. 13/591,092, mailed on Dec. 13, 2012, 13 pages.

Office Action received for Canadian Patent Application No. 2,737,704, mailed on Nov. 05, 2012, 3 pages.

Office Action received for Chinese Patent Application No. 200780025394.4, issued on Oct. 30, 2012, 3 pages.

Office Action received for Australian Patent Application No. 2010249409, issued on Aug. 30, 2012, 5 pages.

Office Action received for Australian Patent Application No. 2011201768, issued on Jun. 21, 2012, 4 pages.

Office Action received for Australian Patent Application No. 2013205681 issued Jun. 27, 2013, 4 pages.

Dale, et al., "Extrusion Processing for Ammonia Fiber Explosion (AFEX)", Applied Biochemistry and Biotechnology, vol. 77-79, 1999, pp. 35-45.

International Search Report received for PCT Patent Application No. PCT/US2011/061617, mailed on Jun. 8, 2012, 5 pages.

Van Horn, et al., "Complete Rations for Growing Dairy Replacements Utilizing By-Product Feedstuffs", Journal of Dairy Science, vol. 63, 1980, pp. 1465-1474.

Advisory Action received for U.S. Appl. No. 12/763,102, mailed Dec. 6, 2013, 3 pages.

Nwodo et al., "Xylanase Production of Aspergillus niger and Penicillium chrysogenum from Ammonia Pretreated Cellulosic Waste", Research Journal of Microbiology, vol. 3, No. 4, 2008, pp. 246-253.

Sun et al., "Hydrolysis of Lignocellulosic Materials for Ethanol Production: a Review", Bioresource Technology, vol. 83, No. 1, 2002, pp. 1-11.

\* cited by examiner

*8 to 16 km; **80.5 km

PRETREATED DENSIFIED BIOMASS PRODUCTS

This application is a U.S. National Stage Filing under 35 U.S.C. 371 from International Application No. PCT/US2010/046525, filed Aug. 24, 2010, and published in English as WO 2011/028543 on Mar. 10, 2011, which claims the benefit under 35 U.S.C. 119 (e) of U.S. Provisional Application Ser. No. 61/236,403 filed on Aug. 24, 2009, which applications and publications are hereby incorporated by reference in their entireties.

STATEMENT OF GOVERNMENT RIGHTS

This invention was made with Government support under DE-FG36-08-GO88073 and DE-FC02-07ER64494 by the U.S. Department of Energy. The Government has certain rights in the invention.

BACKGROUND

Primary biofuels produced today are based on corn and other grains, transesterified biodiesel from oilseed crops, such as soybeans and animal fats. Ethanol production from grains is currently the mainstay of the ethanol industry. Increasingly, however, there is a demand for cellulosic based biofuels. The inventors recognize the need for economically providing pretreated densified biomass products for use in a variety of applications.

SUMMARY

In one embodiment, a product is provided comprising at least one hydrolysable densified biomass particulate having no added binder and comprised of a plurality of lignin-coated plant biomass fibers, wherein the at least one hydrolysable densified biomass particulate has an intrinsic density substantially equivalent to a binder-containing hydrolysable densified biomass particulate and has a substantially smooth, non-flakey outer surface. In one embodiment, the novel product contains trace amounts of ammonia. In one embodiment, the product comprises one or more hydrolysable densified biomass particulates, each particulate having no added binder and an amount of lignin-coated plant biomass fiber sufficient to form a hydrolysable densified biomass particulate which has an intrinsic density substantially equivalent to a binder-containing hydrolysable densified biomass particulate.

In one embodiment, the at least one densified biomass particulate having no added binder has an increased resistance to deformation, an increased hardness, an increased resistance to degradation, an improved shelf life, or a combination thereof, as compared with a binder-containing densified biomass particulate. In one embodiment, the novel product is more able to resist stress and is likely less brittle as compared to a binder-containing densified biomass particulate.

In one embodiment, the novel product is harder, such as at least 21% harder, with at least 20% less variability in hardness than a binder-containing densified biomass particulate of the same given mass.

The novel products described herein can be any suitable shape and size, including, for example, substantially rectangular or substantially cylindrical.

In one embodiment, each of the plurality of lignin-coated plant biomass fibers is coated completely with lignin. In one embodiment, at least some of the plurality of lignin-coated biomass fibers are also coated with hemicellulose. In one embodiment, most of the plurality of lignin-coated plant biomass fibers are also coated with hemicellulose. In one embodiment, substantially all of the plurality of lignin-coated plant biomass fibers are also coated with hemicellulose, such that the hemicelluloses and lignin appear to come to the surface in a "package" rather than as separate components.

Any suitable plant biomass may be used to produce the novel products described herein, including, but not limited to, corn stover, switchgrass, pine and/or prairie cord grass.

In one embodiment, the novel product has an improved shelf life, increased resistance to degradation, increased flowability, and greater bulk density as compared to the binder-containing densified biomass particulate.

In one embodiment, a packaged product comprising a container; and a quantity of densified biomass particulates having no added binder and located within the container is provided, wherein the quantity of densified biomass particulates has a bulk density at greater than a bulk density of an identical quantity of binder-containing densified biomass particulates. The container may be a rigid container or a flexible bag.

In one embodiment, an integrated process is provided comprising subjecting a quantity of biomass fibers to an ammonia pretreatment, wherein at least a portion of lignin contained within each fiber is moved to an outer surface of each fiber to produce a quantity of tacky (i.e., sticky to the touch) biomass fibers; and densifying the quantity of tacky biomass fibers to produce one or more hydrolysable densified biomass particulates, wherein the quantity of tacky biomass fibers is densified without adding binder. In one embodiment the ammonia pretreatment causes at least a portion of hemicellulose contained within each fiber to move to the outer surface of each fiber. In one embodiment, the ammonia pretreatment is an ammonia fiber expansion (AFEX) pretreatment, such as a gaseous AFEX pretreatment.

In one embodiment, a fuel comprising at least one densified biomass particulate of a given mass having no added binder and comprised of a plurality of lignin-coated plant biomass fibers is provided, wherein the at least one densified biomass particulate has an intrinsic density substantially equivalent to a binder-containing densified biomass particulate of the same given mass and has a substantially smooth, non-flakey outer surface. Such a fuel may be useful in biomass-burning stoves or boilers.

In one embodiment, an animal feed comprising at least one densified biomass particulate of a given mass having no added binder and comprised of a plurality of lignin-coated plant biomass fibers is provided, wherein the at least one densified biomass particulate has an intrinsic density substantially equivalent to a binder-containing densified biomass particulate of the same given mass and has a substantially smooth, non-flakey outer surface, wherein the animal feed has improved digestibility as compared with animal feed containing binder-containing densified biomass particulates.

In one embodiment, a solid material comprising at least one densified biomass particulate of a given mass having no added binder and comprised of a plurality of lignin-coated plant biomass fibers is provided, wherein the at least one densified biomass particulate has an intrinsic density substantially equivalent to a binder-containing densified biomass particulate of the same given mass and has a substantially smooth, non-flakey outer surface, wherein the solid material is useful in construction, such as in fiberboard or extruded fibrous building materials.

The resulting pellets are useful in a variety of applications, including, but not limited to, animal feed, chemical conversion, biochemical applications, electricity generating applications (e.g., for burning in a boiler, biomass-burning stove,

DETAILED DESCRIPTION OF THE EMBODIMENTS

Figure 1:
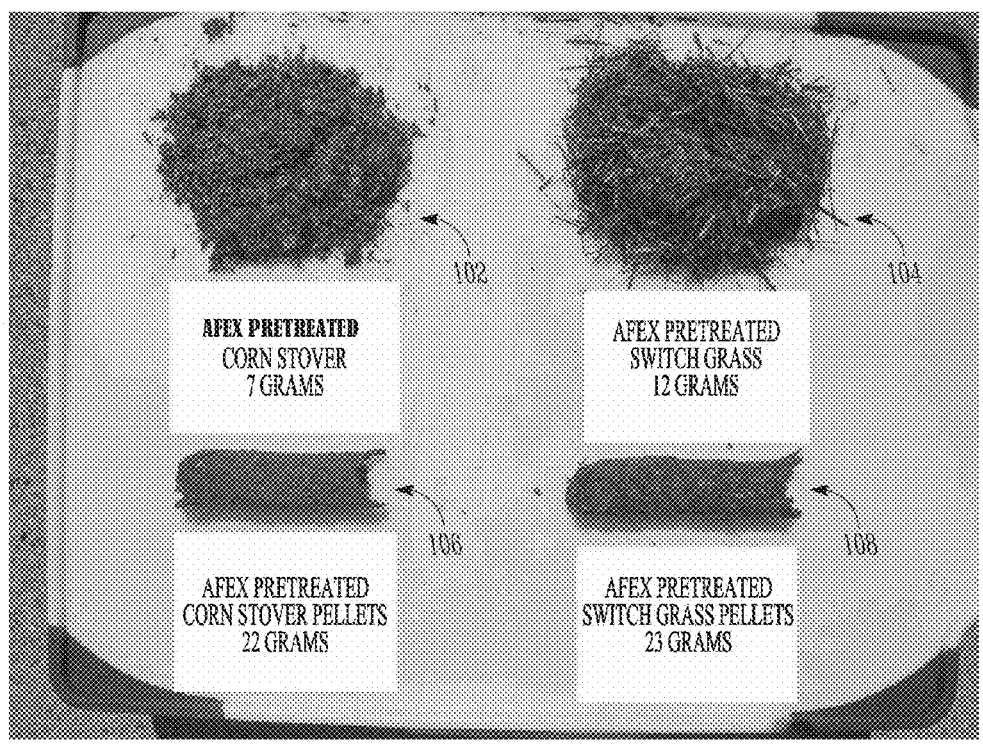
FIG. 1 comprises an image showing AFEX pretreated corn stover (AFEX-CS), AFEX pretreated switchgrass (AFEX-SG), AFEX-CS pellets and AFEX-SG pellets in embodiments of the present invention.

In the following detailed description of embodiments of the invention, embodiments are described in sufficient detail to enable those skilled in the art to practice them, and it is to be understood that other embodiments may be utilized and that chemical and procedural changes may be made without departing from the spirit and scope of the present subject matter. The following detailed description is, therefore, not to be taken in a limiting sense, and the scope of embodiments of the present invention is defined only by the appended claims.

The Detailed Description that follows begins with a definition section followed by a brief overview of cellulosic biomass, a description of the embodiments, an example section and a brief conclusion.

The term "biofuel" or "biomass" as used herein, refers in general to organic matter harvested or collected as a source of energy. Biofuels are originally derived from the photosynthesis process and can therefore be considered a solar energy source. A biofuel is a renewable solid, liquid or gaseous fuel derived from relatively "recently" dead biological material, i.e., "biomass," as distinguished from fossil fuels, which are derived from long dead biological material and are not renewable. There are generally considered to be three types of biofuels, namely, agricultural biofuels (defined below), municipal waste biofuels (residential and light commercial garbage or refuse, with most of the recyclable materials such as glass and metal removed) and forestry biofuels (e.g., trees, waste or byproduct streams from wood products, wood fiber, pulp and paper industries). Biomass can further be in the form of solid biomass, liquid biomass or gaseous biomass.

The term "agricultural biofuel", as used herein, refers to a biofuel derived from agricultural crops, crop residues, grain processing facility wastes (e.g., wheat/oat hulls, corn/bean fines, out-of-specification materials, etc.), livestock production facility waste (e.g., manure, carcasses, etc.), livestock processing facility waste (e.g., undesirable parts, cleansing streams, contaminated materials, etc.), food processing facility waste (e.g., separated waste streams such as grease, fat, stems, shells, intermediate process residue, rinse/cleansing streams, etc.), value-added agricultural facility byproducts (e.g., distiller's wet grain (DWG) and syrup from ethanol production facilities, etc.), and the like. Examples of livestock industries include, but are not limited to, beef, pork, turkey, chicken, egg and dairy facilities. Examples of agricultural crops include, but are not limited to, any type of non-woody plant (e.g., cotton), grains such as corn, wheat, soybeans, sorghum, barley, oats, rye, and the like, herbs (e.g., peanuts), short rotation herbaceous crops such as switchgrass, alfalfa, and so forth.

The term "plant biomass" or "ligno-cellulosic biomass" as used herein is intended to refer to virtually any plant-derived organic matter (woody or non-woody) available for energy on a sustainable basis. Plant biomass can include, but is not limited to, agricultural crop wastes and residues such as corn stover, wheat straw, rice straw, sugar cane bagasse and the like. Plant biomass further includes, but is not limited to, woody energy crops, wood wastes and residues such as trees, including fruit trees, such as fruit-bearing trees, (e.g., apple trees, orange trees, and the like), softwood forest thinnings, barky wastes, sawdust, paper and pulp industry waste streams, wood fiber, and the like. Additionally grass crops, such as various prairie grasses, including prairie cord grass, switchgrass, big bluestem, little bluestem, side oats grama, and the like, have potential to be produced large-scale as additional plant biomass sources. For urban areas, potential plant biomass feedstock includes yard waste (e.g., grass clippings, leaves, tree clippings, brush, etc.) and vegetable processing waste. Plant biomass is known to be the most prevalent form of carbohydrate available in nature and corn stover is currently the largest source of readily available plant biomass in the United States.

The term "pretreatment step" as used herein, refers to any step, i.e., treatment intended to alter native biomass so it can be more efficiently and economically converted to reactive intermediate chemical compounds such as sugars, organic acids, etc., which can then be further processed to a variety of end products such as ethanol, iso-butanol, long chain alkanes etc. Pretreatment can reduce the degree of crystallinity of a polymeric substrate, reduce the interference of lignin with biomass conversion and by hydrolyzing some of the structural carbohydrates, thus increasing their enzymatic digestibility and accelerating the degradation of biomass to useful products. Pretreatment methods can utilize acids of varying concentrations (including sulfuric acids, hydrochloric acids, organic acids, etc.) and/or alkali such as ammonia, ammonium hydroxide, sodium hydroxide, lime, and the like. Pretreatment methods can additionally or alternatively utilize hydrothermal treatments including water, heat, steam or pressurized steam. Pretreatment can occur or be deployed in various types of containers, reactors, pipes, flow through cells and the like. Most pretreatment methods will cause the partial or full solubilzation and/or destabilization of lignin and/or hydrolysis of hemicellulose to pentose sugars.

The term "bulk density" as used herein, refers to the mass or dry weight of a quantity of particles or particulates (granules and other "divided" solids) divided by the total volume they occupy (mass/volume). Therefore, bulk density is not an intrinsic property of the particles, as it is changeable when the particles are subjected to movement from an external source. The volume measurement is a combination of the particle volume (which includes the internal pore volume of a particle) and the intra-particle void volume. Bulk density=intrinsic density (of each particle)×(1−voids fraction). For a given intrinsic particle density, therefore, the bulk density depends only on the void fraction, which is variable.

The term "moisture content" as used herein, refers to percent moisture of biomass. The moisture content is calculated as grams of water per gram of wet biomass (biomass dry matter plus water) times 100%.

The term "Ammonia Fiber Explosion" or "Ammonia Fiber Expansion" (hereinafter "AFEX") pretreatment" as used herein, refers to a process for pretreating biomass with ammonia to solubilize lignin and redeposit it from in between plant cell walls to the surface of the biomass. An AFEX pretreatment disrupts the lignocellulosic matrix, thus modifying the structure of lignin, partially hydrolyzing hemicellulose, and increasing the accessibility of cellulose and the remaining hemicellulose to subsequent enzymatic degradation. Lignin is a primary impediment to enzymatic hydrolysis of native biomass, and removal or transformation of lignin is a suspected mechanism of several of the leading pretreatment technologies, including AFEX. However in contrast to many other pretreatments, the lower temperatures and non-acidic conditions of the AFEX process reduces the conversion of lignin and sugars into lower molecular weight aromatics, furfural, hydroxymethyl furfural, and organic acids that could negatively affect microbial activity. The AFEX process further expands and swells cellulose fibers and further breaks up amorphous hemi-cellulose in lignocellulosic biomass. These structural changes open up the plant cell wall structure enabling more efficient and complete conversion of lignocellulosic biomass to value-added products while preserving the nutrient value and composition of the material. The term "condensed AFEX pretreatment" or "gaseous AFEX™ pretreatment" as used herein, refers to a gaseous AFEX pretreatment as defined herein, which uses gaseous ammonia rather than liquid ammonia. By allowing hot ammonia gas to condense directly on cooler biomass, the biomass heats up quickly and the ammonia and biomass come into intimate contact.

The term "added binder" as used herein, refers to natural or synthetic substances or energy forms added or applied to pretreated biomass to improve stability and quality of a biomass particulate, comprised of a plurality of loose biomass fibers compressed to form a single particulate product, such as a pellet. Examples of commonly added binders include, but are not limited to, heat, steam, water, air, corn starch, lignin compounds, lignite, coffee grounds, sap, pitch, polymers, salts, acids, bases, molasses, organic compounds, urea, and tar. Specialty additives are also used to improve binding and other pellet properties such as color, taste, pH stability, and water resistance. A binder may be added to the biomass at any time before, during or after a pelleting process. The amount of added binder may vary depending on the substrate being densified. Typically, the amount of added binder is about one to ten pounds per ton of loose biomass. Added binder in the form of added energy is typically in the form of convective or conducted heat in the range of 90 to 160° C., although radiated heat may also be used for the same purpose. The heat can be added outright but heat added as a result of the heat of friction developed in the pelleting equipment during operation, is not "added binder."

The term "particulate" as defined herein refers to solid biomass dividable into separate pieces, which can range from small microscopic particles (larger than powders) up to large objects, such as bricks, or larger, such as hay bales or larger, with any suitable mass. The specific geometry and mass will depend on a variety of factors including the type of biomass used, the amount of compression used to create the particulate, the desired length of the particulate, and the particular end use.

The term "pellet" is used interchangeably herein with the term "briquette." More common nomenclature currently in use utilizes the term "briquette" to refer to a compressed particulate (e.g., Example 1) and the term "pellet" to refer to an extruded particulate (e.g., Example 4), i.e., a compressed particulate formed with a shaping process in which material is forced through a die.

The term "flowability" as used herein refers to the ability of particulates to flow out of a container using only the force of gravity. A product having increased flowability, therefore, would flow out of the container at a faster rate as compared to a product having lower flowability.

Nearly all forms of ligno-cellulosic biomass, i.e., plant biomass, such as monocots, comprise three primary chemical fractions: hemicellulose, cellulose, and lignin. Hemicellulose is a polymer of short, highly-branched chains of mostly five-carbon pentose sugars (xylose and arabinose), and to a lesser extent six-carbon hexose sugars (galactose, glucose and mannose). Dicots, on the other hand, have a high content of pectate and/or pectin, which is a polymer of alpha-linked glucuronic acid. Pectate may be "decorated" with mannose or rhamnose sugars, also). These sugars are highly substituted with acetic acid.

Because of its branched structure, hemicellulose is amorphous and relatively easy to hydrolyze (breakdown or cleave) to its individual constituent sugars by enzyme or dilute acid treatment. Cellulose is a linear polymer of glucose sugars, much like starch, which is the primary substrate of corn grain in dry grain and wet mill ethanol plants. However, unlike starch, the glucose sugars of cellulose are strung together by β-glycosidic linkages which allow cellulose to form closely-associated linear chains. Because of the high degree of hydrogen bonding that can occur between cellulose chains, cellulose forms a rigid crystalline structure that is highly stable and much more resistant to hydrolysis by chemical or enzymatic attack than starch or hemicellulose polymers. Lignin, which is a polymer of phenolic molecules, provides structural integrity to plants, and remains as residual material after the sugars in plant biomass have been fermented to ethanol. Lignin is a by-product of alcohol production and is considered a premium quality solid fuel because of its zero sulfur content and heating value, which is near that of sub-bituminous coal.

Typically, cellulose makes up 30 to 50% of residues from agricultural, municipal, and forestry sources. While cellulose is more difficult to convert to ethanol than hemicellulose, it is the sugar polymers of hemicellulose which can be more readily hydrolyzed to their individual component sugars for subsequent fermentation to ethanol. Although hemicellulose sugars represent the "low-hanging" fruit for conversion to ethanol, the substantially higher content of cellulose represents the greater potential for maximizing alcohol yields, such as ethanol, on a per ton basis of plant biomass.

As noted above, the hemicellulose fraction of biomass contains hexose and pentose sugars, while the cellulose fraction contains glucose. In current AFEX pretreatment operations, only limited hemicellulose conversions are obtained. It is further known that of the sugars extracted, about 30 to 35% is xylose and about 35 to 40% is glucose (most all of which is currently converted only in post-pretreatment steps). Overall conversions, as well as over-all ethanol yields, will vary depending on several factors such as biomass type, pretreatment type, and so forth.

Conventional methods used to convert biomass to alcohol include processes employing a concentrated acid hydrolysis pretreatment, a two-stage acid hydrolysis pretreatment as well as processes employing any known conventional pretreatment, such as hydrothermal or chemical pretreatments, followed by an enzymatic hydrolysis (i.e., enzyme-catalyzed hydrolysis) or simultaneous enzymatic hydrolysis and saccharification. Such pretreatment methods can include, but are not limited to, dilute acid hydrolysis, high pressure hot water-based methods, i.e., hydrothermal treatments such as steam explosion and aqueous hot water extraction, reactor systems (e.g., batch, continuous flow, counter-flow, flow-through, and the like), AFEX, ammonia recycled percolation (ARP), lime treatment and a pH-based treatment.

Several of these methods generate nearly complete hydrolysis of the hemicellulose fraction to efficiently recover high yields of the soluble pentose sugars. This also facilitates the physical removal of the surrounding hemicellulose and lignin, thus exposing the cellulose to later processing. However, most, if not all, pretreatment approaches do not significantly hydrolyze the cellulose fraction of biomass.

In one embodiment, an ammonia fiber expansion (explosion) method (AFEX) pretreatment is used as defined herein. See also, for example, U.S. Pat. Nos. 6,106, 888 ('888), 7,187,176 ('176), 5,037,663 ('663), and 4,600,590 ('590), each of which are hereby incorporated by reference in its entirety.

In one embodiment, biomass is heated to a temperature of from about 60° C. to about 100° C. in the presence of concentrated ammonia. See, for example, Dale, B. E. et al., 2004, *Pretreatment of corn stover using ammonia fiber expansion (AFEX)*, *Applied Biochem*, Biotechnol. 115: 951-963, which is incorporated herein by reference in its entirety. A rapid pressure drop then causes a physical disruption of the biomass structure, exposing cellulose and hemicellulose fibers, without the extreme sugar degradation common to many pretreatments.

Nearly all of the ammonia can be recovered and reused while the remaining ammonia serves as nitrogen source for microbes in fermentation. In one embodiment, about one (1) to two (2) wt % of ammonia remains on the pretreated biomass.

Additionally, since there is no wash stream in the process, dry matter recovery following an AFEX treatment is essentially quantitative. This is because AFEX is basically a dry to dry process.

AFEX treated biomass is also stable for longer periods (e.g., up to at least a year) than non-AFEX treated biomass and can be fed at very high solids loadings (such as at least about 40%) in enzymatic hydrolysis or fermentation process as compared with dilute acid or other aqueous pretreatments that cannot easily exceed 20% solids.

Cellulose and hemicellulose are also well-preserved in an AFEX process, showing little degradation. As such, there is no need for neutralization prior to enzymatic hydrolysis of AFEX treated biomass. Enzymatic hydrolysis of AFEX-treated biomass also produces clean sugar streams for subsequent fermentation.

Degradation products from AFEX treated biomass have also been identified and quantified. One such study compared AFEX and acid-pretreated corn stover using LC-MS/GC-MS techniques. In acid-pretreated feedstock, over 40 major compounds were detected, including organic acids, furans, aromatic compounds, phenolics, amides and oligosaccharides. AFEX pretreatment performed under mild alkaline condition produced very little acetic acid, HMF, and furfural. See, Dale, B. E. et al., 2004, supra, and Dale, B. E. et al, 2005b, *Pretreatment of Switchgrass Using Ammonia Fiber Expansion (AFEX)*, *Applied Biochemistry and Biotechnology*. Vol. 121-124. pp. 1133-1142. See also Dale, B. E. et al., 2005a. *Optimization of the Ammonia Fiber Explosion (AFEX) Treatment Parameters for Enzymatic Hydrolysis of Corn Stover*, *Bioresource Technology*. Vol. 96, pp. 2014-2018.

In one embodiment, a modified AFEX pretreatment process is used as described in Example 1. In this method, gaseous ammonia is used, which condenses on the biomass itself.

In one embodiment, AFEX pretreatment conditions are optimized for a particular biomass type. Such conditions include, but are not limited to, ammonia loading, moisture content of biomass, temperature, and residence time. In one embodiment, corn stover is subject to an AFEX pretreatment at a temperature of about 90° C., ammonia: dry corn stover mass ratio of 1:1, moisture content of corn stover of 60% (dry weight basis, (dwb)), and residence time (holding at target temperature), of five (5) min. In one embodiment, switchgrass is subjected to an AFEX pretreatment at a temperature of about 100° C., ammonia loading of 1:1 kg of ammonia: kg of dry matter, and 80% moisture content (dwb) at five (5) min residence time.

Hydrolysis results of AFEX-treated and untreated samples show 93% vs. 16% glucan conversion, respectively. The ethanol yield of optimized AFEX-treated switchgrass was measured to be about 0.2 g ethanol/g dry biomass, which is 2.5 times more than that of the untreated sample. See Dale, B. E. et al., 2005b, supra.

In one embodiment, approximately 98% of the theoretical glucose yield is obtained during enzymatic hydrolysis of an AFEX treated corn stover using 60 filter paper units (FPU) of cellulase enzyme/g of glucan (equal to 22 FPU/g of dry corn stover).

Ethanol yield has been shown to increase by up to 2.2 times over that of an untreated sample. In one embodiment, lower enzyme loadings of 15 and 7.5 FPU/g of glucan do not significantly affect the glucose yield, as compared with 60 FPU. In this embodiment, differences between effects at different enzyme levels decreased as the treatment temperature increased. See, for example, Dale, B. E. et al., 2004, supra; and Dale, B. E. et al., 2004, supra.

Optimal AFEX pretreatment conditions for hydrolysis and fermentation of switchgrass and corn stover are also discussed in Dale, B. E. et al., 2004, supra; Dale, B. E. et al, 2005b, supra; and Dale, B. E. et al., 2005b, supra.

In one embodiment, a modified AFEX treatment with significantly reduced ammonia loadings and lower required concentrations of ammonia is used. See Elizabeth (Newton) Sendich, et al., *Recent process improvements for the ammonia fiber expansion (AFEX) process and resulting reductions in minimum ethanol selling price,* 2008, Bioresource Technology 99: 8429-8435 and U.S. Patent Application Publication No. 2008/000873 to Dale, B. E.

In one embodiment, steam is used as a pretreatment instead of or in addition to an AFEX treatment. However, steam tends to reduce availability of sugars, thus reducing the overall quality of animal feed. Regardless, steam remains a viable optional embodiment for pretreatment. When biomass is being pelletized, the pellets themselves typically become hot. Additionally, water is oftentimes added to bring the biomass up to a desired moisture content, such as between about 10 and 20%, such as about 12 and 18%, such as around 15%±1%. As such, steam typically develops prior to and during an AFEX pretreatment anyway. Addition of additional steam may allow water to be distributed evenly through the pellet. When the pelletization process is complete, steam will evaporate off and leave a pellet that is sufficient dry, i.e., typically about five (5) to 20% moisture, although the invention is not so limited.

Although a non-volatile base, such as sodium hydroxide, may also be used to move the lignin to the surface, the sodium hydroxide which remains after evaporation may negatively impact further application of the treated material, such as for animal feed and other applications.

Due to temperatures reaching the glass transition temperature of the oligomers within the fiber (e.g., lignin, hemicelluloses), pretreatments, such as AFEX (and/or steam) also transfers these oligomers (primarily lignin), and in some embodiments, an amount of hemicellulose, to the surface. Once on the surface, the lignin and hemicellulose are tacky. Surprisingly, these oligomers (lignin or lignin and hemicellulose) contain sufficient tackiness to provide properties at least comparable to an added binder (as the term is defined herein). As such, the inventors have discovered there is no need to cure the pretreated biomass (e.g., with heat) prior to forming them into pellets. Additionally surprising and unexpected is the discovery that there is no need to add binder in any form to produce pellets having properties at least as good as, if not better than, conventional pellets containing binder. The ability to omit the step of adding curing and/or adding binding further provides significant costs savings during production, leading to a product which is not only environmentally green but highly economical and transportable, including transportation by conventional means.

In one embodiment, the densification device utilizes a gear mesh system to compress biomass through a tapering channel between adjacent gear teeth. This densification device operates at temperatures less than 60° C. (See Example 2). In one embodiment energy consumption is minimized and physical and downstream processing characteristics are optimized.

In one embodiment, an alternative pelleting device is used to form more conventional cylindrically-shaped pellets (See Example 4).

Novel Integrated Pretreatment and Densification Process

In one embodiment, an integrated biomass pretreatment and densification process is provided. In a particular embodiment, an ammonia fiber expansion (AFEX) treatment is used in conjunction with a compaction process to produce densified biomass particulates (hereinafter called "pellets"), in a process requiring no added binder.

In one embodiment, the pellets have an inherent density of at least ten (10) times that of baled biomass (which itself is about 192.2 to about 240.28 kg/m$^3$ (about 12 to about 15 lb/ft$^3$)). Use of an integrated process as described herein eliminates the need for further pretreatment at the processing plant and further minimizes the distance that low density feedstock bales need to be transported.

In one embodiment, densified pellets are transported to centralized processing facilities using existing transportation and handling infrastructure used for grains.

In one embodiment, AFEX conditions are optimized according to the type of biomass being processed to enhance binding properties and increase hydrolysis efficiency following densification and storage.

It is further expected that downstream processing characteristics will be at least as good or better than non-densified biomass in terms of hydrolysis, fermentation rates, yields, and so forth.

In one embodiment, AFEX-biomass pellets having no added binder are provided. In contrast to conventional binder-containing pellets, the novel AFEX pellets described herein have a substantially smooth, non-flakey outer surface, likely due to the presence of lignin and, in some embodiments, hemicellulose, on the outer surface of the pellet, which essentially serve as a type of coating. As such, AFEX pellets are not susceptible to flaking (loss of mass) as with a conventional pellet which has no coating and contains removable flakes on its outer surface. In contrast to conventional pellets containing certain binders, such as water, which are dull in appearance, the novel AFEX biomass pellets have a shiny appearance. In some embodiments, the presence of lignin and/or hemicellulose is not restricted to the surface only, but also is found deeper inside the microscopic pores of the biomass particle. Therefore, the AFEX pellet may have added benefits, such as more efficient burning/co-firing with lignite coal than a conventional pellet whose added binder is chemically restricted to the surface of the biomass particle only.

The AFEX pellets further are less bendable and therefore tend to be straighter than conventional pellets. Surprisingly, the novel AFEX pellets have a harder "feel" to them (and are likely less brittle) as compared with the softer feel of a conventional pellet. Hardness tests (Example 4) reveal that the AFEX pellet is stronger initially before suddenly breaking. In contrast, a conventional pellet, such as a non-AFEX pellet, while maintaining strength for a longer time, is essentially more "squeezable" or "squishier" than the novel AFEX pellet (more comparable to softness of a "cigar"). In one embodiment, an AFEX-CS pellet is at least 21% harder and demonstrates at least 20% less variability in hardness. In one embodiment, the novel AFEX pellets exhibit less deformation than conventional pellets (See, for example, Table 7). It is likely that AFEX pellets made from other types of biomass will demonstrate similar or better results.

Lignin is generally darker than other components in plant material, so the resulting material is noticeably darker in appearance than a material not substantially surrounded by lignin.

Figure 2:
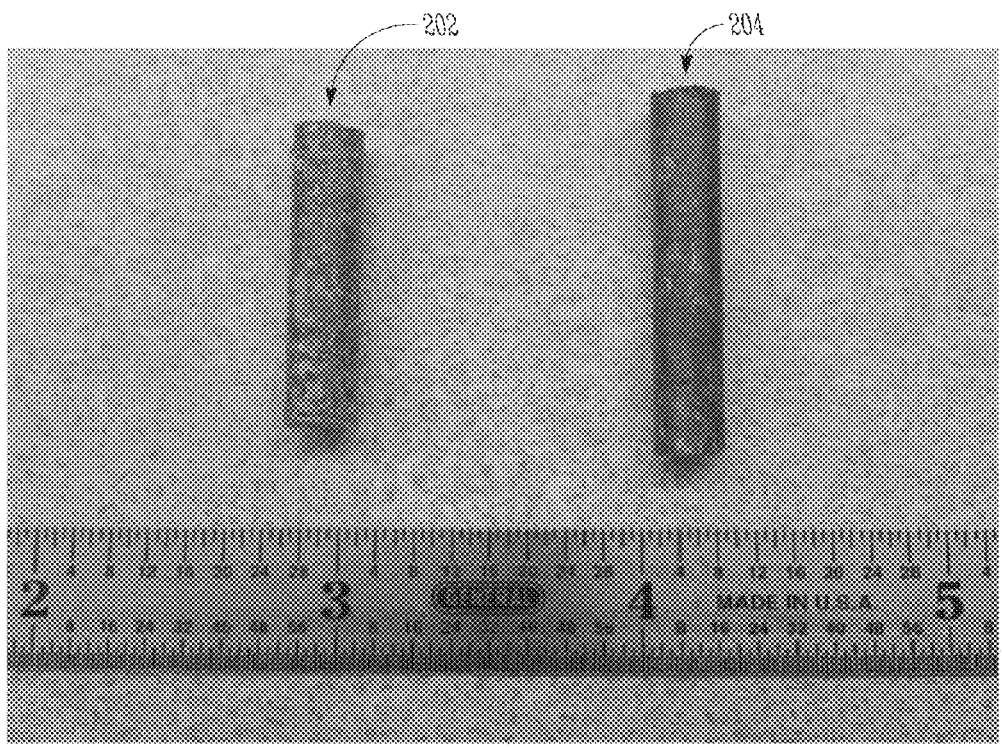
FIG. 2 comprises an image of a binder-containing non-AFEX-CS pellet and an AFEX-CS pellet in an embodiment of the present invention.

FIG. 2 comprises an image of a binder-containing non-AFEX-CS pellet and an AFEX-CS pellet.

In one embodiment, the AFEX-CS pellets have a specific gravity of up to 1.16 as compared with a non-AFEX pellet with a specific gravity of no more than 0.87, although the invention is not so limited. As the AFEX pellets appear to be less porous and further demonstrate superior hardness properties as compared with conventional pellets, AFEX pellets are likely to show improved short and long term storage properties including, flowability, compression strength, water solubility, absorption, and overall shelf life, with reduced susceptibility to degradation due to heat, bugs, and the like.

It is also expected that the AFEX pellets will have an improved flowability. Further testing, as noted in prophetic examples will quantify the amount of improvement.

The resulting pellets are useful in a variety of applications, including, but not limited to, animal feed, chemical conversion, biochemical applications, electricity generating applications (e.g., burning in a boiler), fuel for biomass-burning stoves, and as a component in solid materials, such as fiberboards and extruded fibrous building materials.

The ammonia pretreatment in the various AFEX processes described herein dissolves a certain amount of lignin and further brings a significant amount of lignin from the interior of a plant material to the outer surface or outer edges of the fiber. As a result, the material is more easily digested by animals. In one embodiment, a combination of the novel AFEX pellets as described herein together with suitable additives and fillers as is known in the art produces a novel animal feed.

A blending of the novel AFEX pellets with coal provides a novel feed material in power plants.

The logistics of harvesting, handling, transporting, and storing low bulk density feedstocks is a significant challenge to the developing bioeconomy. Assuming a yield of 70 gal/ton, biomass baled at a density 120 kg/m3 would 15 require over ten times the volume of material for a given volume of ethanol compared with corn grain. This lower bulk density will not allow trucks to reach maximum weight capacity, further increasing the number of trucks required for feedstock supply. Biomass densification of untreated biomass through an extrusion pelleting process has been demonstrated, but at a cost that limits the ability to lower net costs for 20 feedstock delivery.

As the bioeconomy develops individual producers will need the flexibility to sell their biomass into the bioenergy market as economics warrant. For example, with use of regional biomass processing centers (RBPCs) (within a 5 to 10 mile area, for example), round bales may be transported using the existing infrastructure and equipment of the trucking industry. Because the RBPCs will be scaled appropriately, trucking distances for round bales will be minimized. Moreover, the presence of multiple, distributed RBPCs will minimize need for long term storage of round bales. Shorter term storage would use bale wraps and other current methods to minimize expense. With use of the novel integrated AFEX pretreatment/densification system described herein, densified pellets will then be more efficiently transported to centralized processing sites.

The invention will be further described by reference to the following examples, which are offered to further illustrate various embodiments of the present invention. It should be understood, however, that many variations and modifications may be made while remaining within the scope of the present invention.

Example 1

Corn stover (CS) (everything remaining after grain is harvested, typically including stalks and leaves w/o cobs)) from a hybrid corn plant (*Zea mays* L.) grown at the Michigan State University (MSU) Agronomy Center Field was harvested in October 2007, and stored at room temperature in individual five (5) kg bags which were housed in a 30-gal trash bin. Switchgrass (SG) from the "Alamo" lowland variety of seed, *Panicum virgatum* L. grown at the Thelen Field located on Farm Lane at MSU, was harvested in October, 2005, and stored in sealed Ziploc® brand plastic bags in a freezer at four (4) ° C.

The CS and SG were each subjected to an AFEX pretreatment comparable to the methods described in U.S. Pat. Nos. '888, '176, '663, and '590 noted above, but with certain modifications. Specifically, rather than applying liquid ammonia to the biomass and allowing the ammonia and biomass to react as in a conventional AFEX pretreatment, gaseous ammonia was used instead. By allowing hot ammonia gas to condense directly on cooler biomass, the ammonia and biomass become well-mixed.

The gaseous AFEX pretreatment was performed in the Biomass Conversion Research Laboratory at Michigan State University, East Lansing, Michigan. Unless otherwise noted, standard laboratory equipment available in conventionally stocked laboratories was used. The AFEX pretreatment was performed in an approved ventilation hood with protective glass sash minimum face velocity of 75 feet/minute.

A Parr Instruments Model 4524 bench top reactor (hereinafter "4254 reactor") was used for this testing. The reaction chamber was first placed into the heating mantle of the 4254 reactor. A J-type T-couple temperature probe was connected to a Parr Instruments Model 4843 Modular (heat) controller (hereinafter "4843 controller") on one end and to the reaction chamber on the other end by placing the temperature probe against the internal wall of (about half-way down) the reaction chamber. The reaction chamber was then covered with a custom-fabricated circular stainless sheet metal piece having an approximately 12.7 cm (about five (5) in) diameter relief cut out for the temperature probe. The controller was turned on to low (with a red heater switch) and a J-type temperature (blue) controller showed a room temperature reading of about 25° C.±5° C.

A (yellow) K-type thermocouple (red display) and (green) Omega brand CX105 pressure connector (having offices in Stamford, Conn.) (green display) from the controller were briefly connected to test the 4254 reactor cover probes. The red display showed a room temperature reading of about 25° C.±5° C. The green display showed a one (1) atm gauge pressure reading of −0.34 to about 0.34 atm (about −5 to about 5 psig). The yellow and green connecters and 4254 reactor cover were then set aside and the blue preheat temperature was turned on to preheat the 4254 reactor to a target temperature of room temperature +20° C. The blue display was observed for about five (5) minutes to ensure that the blue temperature increased at a rate of about three (3) ° C./minute.

A Sartorius MA35 moisture analyzer (Goettingen, Germany) was used to determine the moisture content of each of the biomass samples. Initial moisture measurements for the samples were typically five (5) to ten (10) % total moisture wet basis (mwb). The dry weight of each sample added to the 4254 reactor was 150 g dry weight, i.e., "dry biomass." An amount of biomass was then weighed out to result in 150 g of dry biomass (as given by the total moisture calculation). For example, for a biomass sample containing five (5) % total moisture (mwb), the following calculation would be made: x (g) of water in biomass=150 g dry biomass/(1-0.05)−150 g dry biomass). Solving for "x" results in 7.9 g of water present in the biomass.

A calculation was then made to determine the amount of deionized water to be added to each sample. For corn stover, the desired percentage of total water to dry biomass was 60%. For switchgrass, the desired value was 80%. These values were selected because they represent the optimal respective biomass moistures for maximum glucose and xylose yields from enzymatic hydrolysis after AFEX.

Therefore, for a corn stover sample with 7.9 g of water already present, but requiring 60% (dwb) moisture, the following calculation would be made: x (g) water to be added to biomass=(0.6*150 g dry biomass)−7.9 g water already in biomass. Solving for "x" would result in 82.1 g of water to be added. The total weight of a 150 g (dwb) corn stover sample in this instance would be 82.1+g+7.9 g+150 g=240 g. Water was misted onto each biomass sample with a water bottle until the total weight (dry biomass (g)+water desired (g)) was achieved. The biomass was evenly coated with water by stiffing the biomass.

An empty 500 ml ammonia cylinder having a 208 g maximum fill level (Parker 500 ml spun 316 Stainless steel pressure vessel (hereinafter "Parker cylinder") with high-pressure Swagelok® Series 83 two-way ball valves installed at both ends, made by Swagelok Co. (having offices in Chicago, Ill.) was weighed. Since eight (8) g was determined to be the approximate residual ammonia left in the cylinder after completion of this step, the total weight of the cylinder and ammonia required for AFEX treatment was determined by adding eight (8) g to the weight of the amount of ammonia needed.

The Parker cylinder was attached to an Airgas™ brand stock ammonia tank (with siphon tube) made by Airgas, Inc. (Radnor, Pa.), by opening the inlet valve on the ammonia tank, followed by opening the inlet valve on the Parker cylinder. The Parker cylinder was allowed to fill until it was cold and no more filling noise from the cylinder could be heard (elapsed time was about one (1) min). The exit valve on the ammonia tank was opened about ¼ way. After a few trials, it was determined that it took about 20 seconds to add 158 g of ammonia to the Parker cylinder. Thereafter, all valves were closed, starting with the exit valve of the Parker cylinder and finally the exit valve on the ammonia tank. The Parker cylinder was weighed to make sure the total weight was equal to the expected weight. Some ammonia was released under the hood if the weight was too great. When it was not enough, the above step was repeated.

The Parker cylinder, now containing ammonia, was heated by first wrapping it in BH Thermal brand Briskheat (Columbus, Ohio) heat tape and plugging in the BH Thermal brand Briskheat (Columbus, Ohio) heat tape controller. Cylinder pressure started at 0-125 psig (depending on the temperature of the ammonia inside the cylinder, as it became cold during the filling step). The Parker cylinder was heated to 600 psig (40 bar), adjustable from 400 psig (27 bar) for "colder" reactions (80° C.) to 1000 psig (70 bar) for hot reactions (160° C.). The pressure increased slowly, but always at a rate less than 0.034 atm/sec (five (5) psig/sec).

The desired biomass was then added to the reaction chamber. The (black) temperature probe was removed from the reaction chamber and placed into the slot on the side of the heater mantle that allowed the outside surface temperature of the reaction chamber to be measured. The (blue) display temperature was adjusted (using arrow keys) +20 degrees more than the original preheat to allow for the continued heating of the reaction chamber.

The cover of the reaction chamber was replaced and a funnel was added. The selected biomass sample was then poured down the funnel into the reaction chamber. Once added, the (yellow) temperature probe tip was completely covered with biomass and was observed to be about 2.54 cm (about one (1) in) from the ammonia input nozzle of the cover. The funnel was then removed, the cover returned on top of the 4254 reactor and brackets were tightened with bolts to seal it in place.

The Parker cylinder was then attached to the reaction chamber. A Welch Model 8803 vacuum pump. (Niles, Ill.) was also attached to the reaction chamber. The vacuum valve on the 4524 reactor was opened and the vacuum was turned on to pump air from the 4254 reactor for one (1) minute. The vacuum valve was closed and the vacuum was turn off. The (yellow) temperature probe and (green) pressure connector was plugged into the 4843 controller. The valve on ammonia cylinder (only) leading towards reaction chamber was opened.

The AFEX reaction was started by opening the 4254 reactor valve connected to the Parker cylinder. When the pressure between the Parker ammonia cylinder and the reaction chamber was equalized, the valves between the ammonia cylinder and the reaction chamber were closed (i.e., after about one (1) min). The heat tape on the Parker cylinder was also turned off. The 4843 reactor heater was left on a low setting at 20° C. above the original temperature used at pre-heat. After about one (1) minute the peak (red) display temperature and (green) pressure were recorded. When the (red) display temperature did not get >100° C. within 1 minute, it meant the feedstock is not touching the temperature probe. The temperature and pressure were recorded approximately every five (5) minutes thereafter.

Starting approximately five (5) minutes before expansion step noted below, the vacuum was detached from the 4524 reaction chamber cover. The ammonia cylinder pipe was removed from the reaction chamber cover. The reaction chamber was rotated so that the 4524 pressure release valve was facing toward the back of the fume ventilation hood. The ventilation hood sash was adjusted for maximum face velocity (75 feet/minute recommended). Expansion step: Ear protection was worn. The ammonia pressure in the 4524 was released by opening the pressure release valve quickly.

The reaction chamber cover was removed. The biomass was removed and placed in a tray and left under the ventilation hood to allow ammonia vapor to volatilize. The AFEX biomass was allowed to air-dry over-night. The Parker cylinder was weighed to determine residual grams of ammonia applied to the biomass and the weight was recorded. The remaining ammonia (approximately 8 g) was released from the Parker cylinder inside of ventilation hood.

Example 2

Starting Materials and Sample Preparation

Corn stover (CS) obtained from the same source as in Example 1 was used. Two samples, two (2) kg each, of each type of biomass were then subjected to the AFEX pretreatment according to the method described in Example 1. After pretreatment, samples were densified using a pelleting device (Federal Machine Co. d/b/a ComPAKco, LLC, Fargo, N.D.) to produce AFEX corn stover (AFEX-CS) pellets and AFEX switchgrass (AFEX-SG) pellets.

FIG. 1 shows an image of the four resulting products, which include seven (7) g of AFEX-CS 102, 12 g of AFEX-SG 104, a 22 g AFEX-CS 106 pellet and a 23 g AFEX-SG pellet 108). The AFEX-CS and AFEX SG pellets, 106 and 108, respectively, had a substantially rectangular shape. Both pellets 106 and 108 were about 2.54 cm (about one (1) in) wide, about 1.27 (0.5 in) depth and about 10.16 to about 12.7 cm (about four (4) to about five (5) in) in length. (Pellet length is dependent on the particular setting use on the ComPAKco machine).

This image illustrates that just seven (7) to 12 grams of unpelleted biomass, such as AFEX-CS 102 and AFEX-SG 104, occupies more space than a 22 or 23 g pellet, such as AFEX-CS pellet 106 and AFEX-SG pellet 108. In this instance, the unpelleted biomass (102 and 104) occupies about 570 to about 980% more space than the pelleted biomass (106 and 108).

Testing Performed

Several additional samples were prepared in the manner described above and subjected to preliminary physical tests such as Angle of Repose (°) according to the method described in Carr, R. L. Jr. 1965. Evaluating flow properties of solids. *Chemical Engineering* 72(3): 163-168.

Thermal Conductivity (W/m° C.) was determined with a thermal properties meter (KD2, Decagon Devices, Pullman, Wash.) that utilized the line heat source probe technique described in Baghe-Khandan, M., S. Y Choi, and M. R. Okos. 1981, *Improved line heat source thermal conductivity probe, J. of Food Science* 46(5):1430-1432.

Water activity was measured using a calibrated water activity meter (AW Sprint TH 500, Novasina, Talstrasse, Switzerland).

Bulk density (kg/m$^3$), true density (kg/m$^3$) and porosity were determined using a multivolume pycnometer (Micromeritics model 1305, Norcross, Ga.) as described in Sahin, S. and S. G. Sumnu. 2006, *Physical properties of foods*, New York, N.Y.: Springer Science Media, LLC.

Moisture Content (% db) was determined by ASAE standard method S352.1 using ISOTEMP laboratory scale (model no: 838F, Fisher Scientific, Pittsburg, Pa.) as described in *ASAE Standards.* 51$^{st}$ ed. 2004. 5352.1: *Moisture measurement—Grain and seeds*, St. Joseph, Mich.: ASABE.

Color properties (L*, a*, b*) were measured using a spectrocolorimeter (LabScan XE, Hunter Associates Laboratory, Reston, Va.).

Roundness and sphericity were determined using an Olympus SZH10 stereo microscope with a DP digital camera, followed by image analysis of the particles by Image Pro Plus® software.

Water Solubility Index (%) and Water Absorption Index (-) were calculated using the method described in Anderson, R. A., H. F. Conway, V. F. Pfeifer, and E. L. Griffin. 1969, Gelatinization of corn grits by roll and extrusion cooking, Cereal Science Today 14 (1): 4.

Results are shown in Table 1 below:

TABLE 1

Physical properties of AFEX-CS and SG vs. AFEX-CS and AFEX-SG Pellets*

| Biomass type | AoR (°) | TC (W/m ° C.) | aw (—) | BD (kg/m³) | Porosity (—) | TD (kg/m³) | MC (% db) | Color L* | a* | b* | Roundness (—) | Sphericity (—) | WAI (—) | WSI (%) |
|---|---|---|---|---|---|---|---|---|---|---|---|---|---|---|
| AFEX® switchgrass pellets | 57.4a | 0.035b | 0.575c | 547.2a | 0.487 | 918a | 13.9b | 21.7b | 2.21c | 6.47b | 0.56a | 0.64a | 6.30b | 6.74a |
| AFEX® switchgrass biomass | 56a | 0.055a | 0.787a | — | 0.640a | — | 29.3a | 17.8c | 2.20c | 5.94b | 0.635a | 0.52c | 6.17b | 6.14a |
| AFEX® Corn stover pellets | 60.6a | 0.04ab | 0.451b | 549.2a | 0.376b | 722b | 7.41c | 21.5b | 3.14b | 6.70b | 0.45b | 0.6b | 7.14ab | 4.36a |
| AFEX® corn stover biomass | 54.4a | 0.045ab | 0.672b | — | 0.657a | — | 16.7b | 24.2a | 3.69a | 8.81a | 0.56a | 0.61ab | 8.03a | 5.63a |

*Similar letters for a given property is not significantly different at α = 0.05
n = 2 for all the properties analyzed
AoR—Angle of Repose (°); TC—Thermal Conductivity (W/m ° C.); aw—Water activity (—); BD—Bulk density (kg/m³); TD—True Density (kg/m³); MC—Moisture Content (% db);
L*—Brightness or luminosity; a*—redness or greenness; b*—yellowness or blueness; WAI—Water Absorption Index (—); WSI—Water Solubility Index (%)

Conclusions

The AFEX-CS pellets (e.g., 106) and AFEX-SG pellets (e.g., 108), had a relatively smooth surface and held together well during handling. The AFEX pellets of both the corn stover and switchgrass possess lower porosity, water adsorption index, water activity, and moisture content as compared to the non-pelleted AFEX samples. Such properties are an indication of improved storability for the pelleted biomass. Lower porosity, higher bulk density and higher true density of the pellets are also indicative of reduced shipping costs.

The pellets exhibited other desirable properties as shown in Table 1. In particular, the pellets demonstrated a high angle of repose. A pellet's angle of repose is defined as the angle between the horizontal and the plane of contact between two pellets when the upper pellet is just about to slide over the lower. This is also known as angle of friction. Therefore, particles have an expected value of 45 degrees. Both the corn stover pellets and switchgrass pellets tested herein exhibited higher than expected angles of repose of 57.4 and 60.6, respectively, as shown in Table 1. These values are likely related to the pellets' substantially rectangular geometry.

Example 3

The purpose of this experiment was to compare hydrolysis properties of AFEX-CS pellets as compared with AFEX-CS biomass (i.e., unpelleted).

Starting Materials

Corn stover (CS) obtained from the same source as in Example 1 was used. An AFEX pretreatment was performed on the CS in the same manner as described in Example 1. Pellets were made according to the method described in Example 2.

Tested samples included 1.7 g of AFEX-CS biomass, a 1.6 g AFEX-CS pellet, and a 2.2 g AFEX-CS soaked in 100 ml amount of de-ionized water at 25° C. for five (5) minutes before hydrolysis to produce a soaked AFEX-CS pellet.

Procedure

After being placed in a 500 ml beaker, an enzymatic hydrolysis was performed on each sample according to a standard laboratory protocol at one (1)% solids loading. See, for example, Shishir P. S. Chundawat, Balan Venkatesh, Bruce E. Dale, 2005, Effect of particle size based separation of milled corn stover on AFEX pretreatment and enzymatic digestibility, Biotechnology and Bioengineering, Vol. 96, Issue 2, pp 219-231.

Fifteen Filter Paper Units (FPU) of an enzyme, specifically Spezyme® CP (Genencor®, a Danisco Division, having offices in Rochester, NY whole cellulose, was added. The samples were incubated at 50° C. in a New Brunswick incubator Innova 44, (Edison, N.J.) while being shaken at 150 RPM within the incubator. Observations and samples were taken at 6 hrs, 24 hrs and 72 hrs incubation time.

Results

Figure 3A:
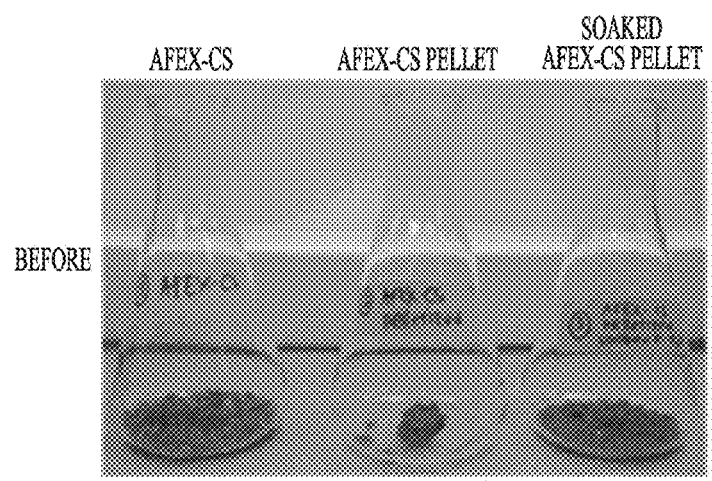
FIGS. 3A-3E are images taken at various times of three biomass samples, including AFEX-CS, AFEX-CS pellets, and soaked AFEX-CS pellets in embodiments of the present invention.
Figure 3B:
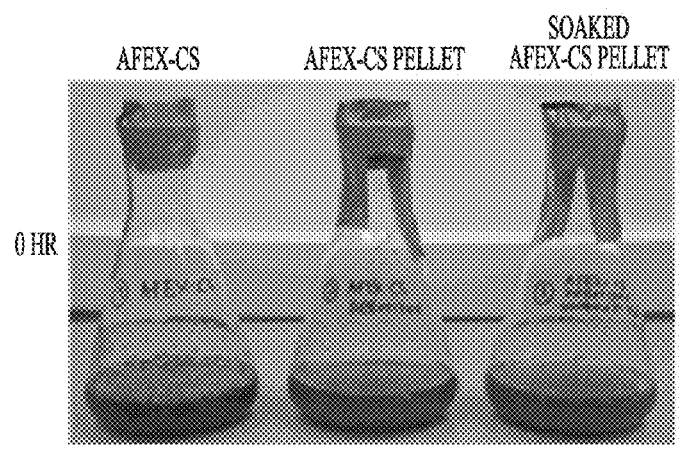
Figure 3C:
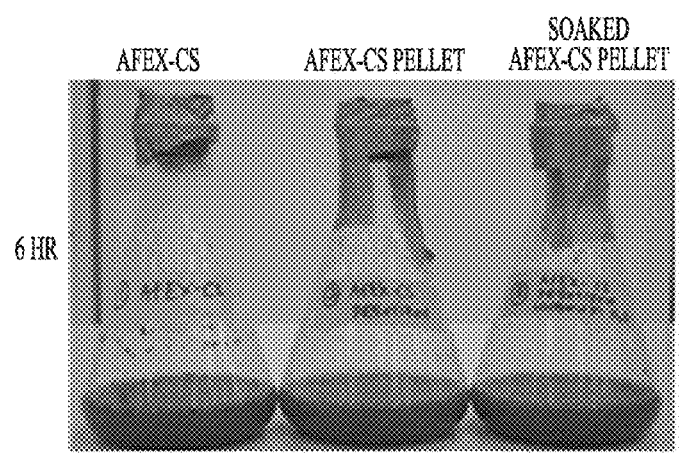
Figure 3D:
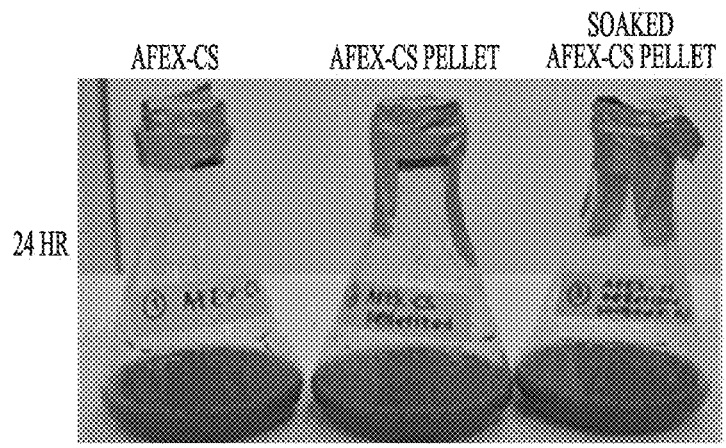

A visual inspection of the resulting hydrolysates indicates that each of the three samples completely dissolved immediately upon water addition. (FIG. 3B). Therefore, it is apparent that all three samples hydrolyzed to substantially the same extent in substantially the same amount of time.

Approximately two (2) ml samples were taken from the incubator were filtered and run through a Shimadzu high pressure liquid chromatographer (HPLC) Model LC-2010HT w/ELSD-LT to determine glucan and xylan conversions.

FIGS. 3A-3E are images taken at various times of three biomass samples, including AFEX-CS, AFEX-CS pellets, and soaked AFEX-CS pellets. FIGS. 4A and 4B are comparative hydrolysis graphs showing glucan conversions of the samples shown in FIGS. 3A-3E. As can be seen, the glucan conversions remain substantially the same across each sample.

Table 2 shows percent of glucan converted to glucose at various times in each of the samples.

TABLE 2

Percent of Glucan converted to Glucose

| Biomass type | % glucan conversion (to glucose) 6 h | % glucan conversion (to glucose) 24 h | % glucan conversion (to glucose) 72 h |
|---|---|---|---|
| AFEX CS | 44.3 | 61.7 | 71.4 |
| AFEX CS-Pellet | 48.3 | 65.9 | 73.7 |
| Soaked AFEX CS-Pellet | 47.5 | 64.0 | 71.3 |

Table 3 shows the percentage of total glucose produced between samplings.

TABLE 3

Percentage of total glucose produced between samplings

| Biomass type | % total glucose 6 h | % total glucose 24 h | % total glucose 72 h |
|---|---|---|---|
| AFEX CS | 44.3 | 17.4 | 9.7 |
| AFEX CS-Pellet | 48.4 | 17.5 | 7.8 |
| Soaked AFEX CS-Pellet | 47.5 | 16.5 | 7.3 |

Table 4 shows percentage of total xylan converted to xylose and total xylan in each sample before hydrolysis.

TABLE 4

Percentage of total xylan converted to xylose

| Biomass Type | % xylan conversion (to xylose) 6 h | % xylan conversion (to xylose) 24 h | % xylan conversion (to xylose) 72 h | Total Xylan (g) |
|---|---|---|---|---|
| AFEX CS | 16.5 | 29.7 | 37.9 | 0.42 |
| AFEX CS-Pellet | 24.1 | 39.6 | 48.0 | 0.38 |
| Soaked AFEX CS-Pellet | 11.8 | 19.3 | 23.4 | 0.72 |

Table 5 shows the percentage of total xylose produced between samplings.

TABLE 5

Percentage of total xylose produced between samplings

| Biomass type | % total xylose 6 h | % total xylose 24 h | % total xylose 72 h |
|---|---|---|---|
| AFEX CS | 16.5 | 13.2 | 8.1 |
| AFEX CS-Pellet | 24.1 | 15.5 | 8.4 |
| Soaked AFEX CS-Pellet | 11.8 | 7.5 | 4.0 |

Conclusion

Figure 3E:
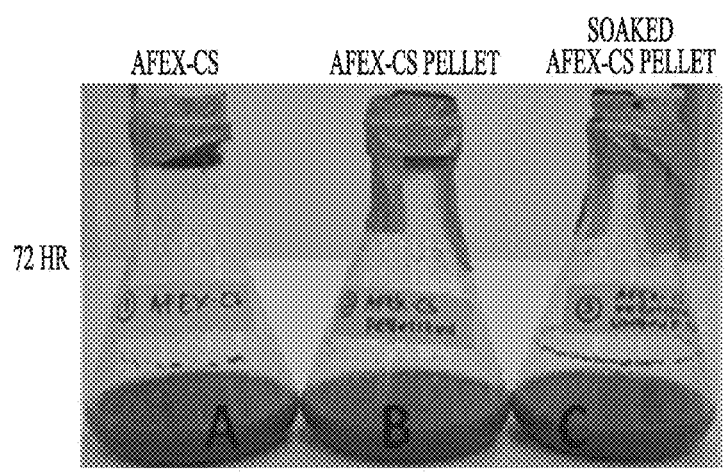
Figure 4:
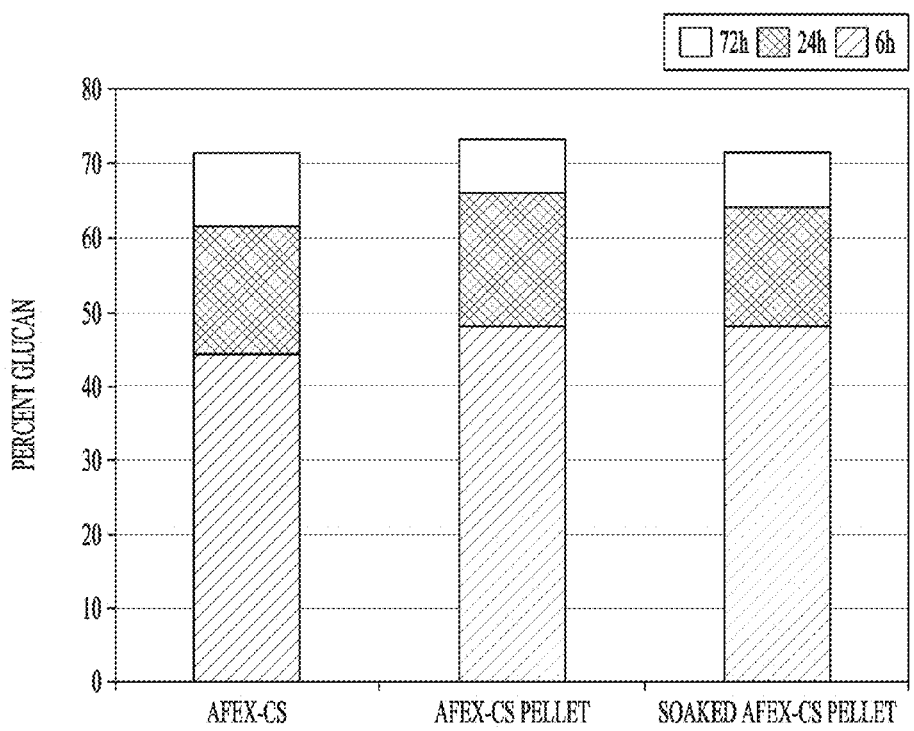
FIG. 4 is a graph show % glucan conversion versus biomass at 6 hr, 24 hr and 72 hr for the biomass samples shown in FIGS. 3C-3E in embodiments of the present invention.
Figure 5:
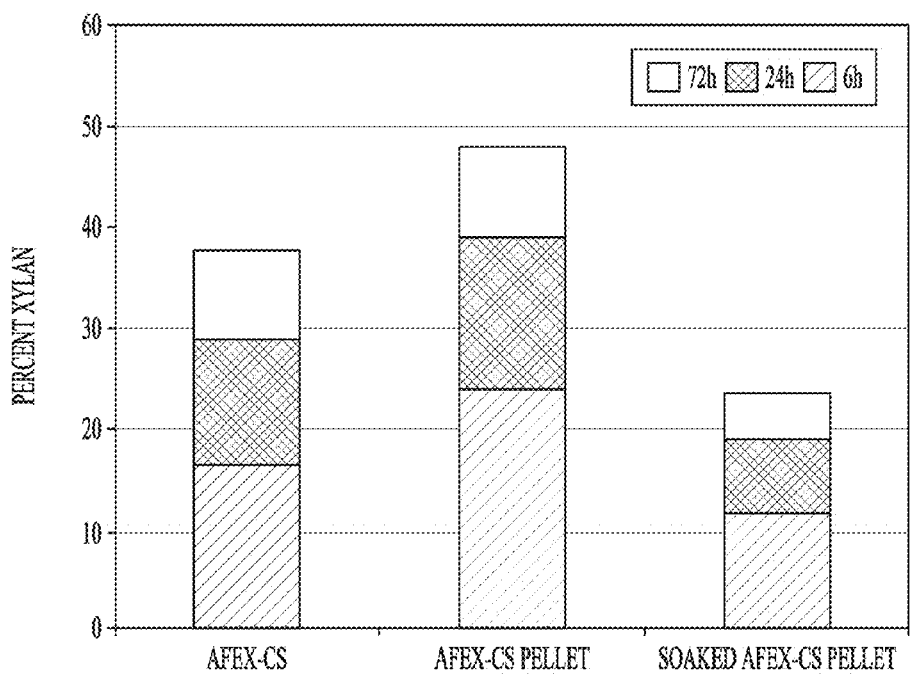
FIG. 5 is a graph show % xylan conversion versus biomass at 6 hr, 24 hr and 72 hr for the biomass samples shown in FIGS. 3C-3E in embodiments of the present invention.

The substantially instantaneous hydrolyzing (e.g., wetting and dispersion) in the AFEX-CS pellet demonstrates that pelleting of corn stover biomass does not affect hydrolysis. It is likely that other AFEX pellets made from other biomass materials will behave in a similar manner. Indeed, as FIG. 3B shows, most of the biomass in each pellet is converted to sugar within six (hrs), which compares favorably with the unpelleted AFEX-CS biomass sample. Additionally, both pellets (AFEX-CS pellet and the soaked AFEX-CS pellet) hydrolyzed to nearly the same extent as the unpelleted sample. This determination was made by observing the lack of solids remaining after 72 hours (FIG. 3E). Since the three samples had virtually the same conversions, the test was concluded at 72 hours. These results are confirmed in FIGS. 4A and 4B.

Example 4

This test was performed to determine the comparative hardness between AFEX-CS pellets and non AFEX-CS pellets.

Starting Materials

CS obtained from the same source as in Example 1 was used in this testing. Some of the CS was subjected to the AFEX pretreatment as described in Example 1. No additional treatment was performed on the AFEX-treated biomass prior to pelleting, including no added binder and no artificial drying (any evaporation occurring in open air at room temperature is considered to be negligible during the course of the testing procedure).

The remaining portion underwent a different (non-AFEX) procedure, which included adding approximately five (5) to ten (10) g of water per 100 g of CS to bring the moisture content of the biomass to 15% wet basis (wb) prior to pelleting.

Lodgepole pine biomass from the Driftmier Engineering Laboratory at the University of Georgia (Athens, Ga.) also underwent a similar non-AFEX procedure, and because the biomass moisture was measured to be greater than 15%, it was put in a dryer until it was at 12-15% moisture.

Ten (10) AFEX-CS pellets and ten (10) non-AFEX-CS pellets were formed with a Yankee Pellet Machine Model 400 (Yankee Pellet Mill, Effingham, N.H.), a centrifugal die mill which produces pellets currently considered the industry standard. Ten (10) non-AFEX pine pellets were pelletized using a California Pellet Machine, Model CL (CPM, Crawfordsville, Ind.).

Pellets produced on both these machines have a substantially cylindrical shape and are about six (6) mm in diameter. Length can be varied as desired, but is generally more uniform than the device used above in Example 2. For purposes of testing, the pellets were about one (1) inch.

Procedure

The pellets were tested for hardness using a 12 T Carver Laboratory Hydraulic Press/Hardness testing apparatus with 400 PSI gauge (Carver, Wabash, Ind.). Specifically, this test measured the amount of force needed to crush each pellet beyond its yield strength. The determination of "yield strength" was made through trained observation and "feel." Specifically, pressure was applied to each pellet until the tester observed and felt the pellet "give." Multiple pellets were tested and an average hardness, i.e., pressure required to cause pellets to yield (Table 6), and average deformation (Table 7) were determined Results Comparative hardness results are shown below in Table 6:

TABLE 6

Comparative Pellet Hardness for AFEX and non-AFEX pellets

| non-AFEX pellets (psi) | AFEX pellets (psi) | Non-AFEX Pine pellet |
|---|---|---|
| 140 | 120 | 125 |
| 130 | 120 | 125 |
| 70 | 100 | 75 |
| 100 | 140 | 90 |

TABLE 6-continued

Comparative Pellet Hardness for AFEX and non-AFEX pellets

| non-AFEX pellets (psi) | AFEX pellets (psi) | Non-AFEX Pine pellet |
|---|---|---|
| 90 | 140 | 90 |
| 70 | 110 | 110 |
| 120 | 130 | 130 |
| 70 | 130 | 75 |
| 90 | 120 | 80 |

Measurements of the final diameter of each pellet after it "gave" were also made. These measurements are shown in Table 7. (Note that the data is randomized as compared with Table 6).

TABLE 7

Comparative Pellet Deformation for AFEX and non-AFEX Pellets (initial diameter: 6 mm)

| non-AFEX CS pellets (mm) | AFEX pellets CS (mm) | Non-AFEX Pine pellet (mm) |
|---|---|---|
| 5.26 | 4.66 | 5.08 |
| 4.67 | 5.28 | 5.07 |
| 4.96 | 5.28 | 5.13 |
| 4.84 | 4.98 | 5.1 |
| 5.2 | 4.73 | 5.28 |
| 5.08 | 5.18 | 4.59 |
| 4.76 | 5 | 4.75 |
| 4.15 | 5.12 | 4.61 |
| 5.39 | 5.36 | 4.98 |

The untreated, binder-added corn stover pellets average yield point was 98 psi +25 psi. The AFEX, no binder added corn stover pellets average yield point was 119 psi +20 psi, and the non-AFEX binder-added pine pellet average yield point was 98 psi +23 psi.

All cylindrical pellets had a beginning diameter of 6.00 mm The untreated, binder-added corn stover pellets average deformation at yield was 1.06 mm +0.36 mm The AFEX, no binder added corn stover pellets average deformation at yield was 0.95 mm +0.24 mm, and the non-AFEX, binder-added pine pellet average deformation at yield was 1.06 mm +0.23 mm Conclusion The AFEX pellets showed greater durability as compared to non-AFEX pellets. AFEX pellet quality is also more consistent than the non-AFEX pellets. As such, it is expected that any given AFEX pellet is less likely to be deformed or disfigured (not a cylindrical shape) as compared with a non-AFEX pellet.

Example 5

This test was performed to determine the bulk density of AFEX-CS pellets as compared to non-AFEX CS pellets.

AFEX-CS pellets and non-AFEX CS produced according to the method described in Example 4 (about six (6) mm in diameter and about one (1) inch in length) were added to a 500 ml beaker and weighed.

The non-AFEX CS pellets had a bulk density of about 36 lb/ft$^3$ (553 g/L), while the AFEX-CS pellets had a bulk density of about bout 38 lb/ft$^3$ (578 g/L).

As this preliminary test indicates, the AFEX-CS pellets showed a higher bulk density than the non-AFEX CS pellets. This is likely due to their smooth non-flaky outer surface (which also is expected to improve their flowability), as compared to the rough flaky outer surface of the non-AFEX pellets. It is expected that a test performed on a larger scale would demonstrate an even greater difference in bulk density. Likely, the edge effects caused by the small size of the container were a significant factor in this preliminary testing.

It is also possible that pellets which are longer than the one (1) inch pellets may weigh each other down to create a higher mass at a higher density. Alternatively, shorter pellets may pack better. Additional testing (including in larger containers) will be performed to optimize pellet size, and therefore, overall bulk density, for a given application.

Example 6

In this testing, various properties of untreated corn stover briquettes was were compared with AFEX-pretreated corn stover briquettes.

Starting Materials

Corn stover (CS) obtained from the same source as in Example 1 was used. An AFEX pretreatment was performed on the CS in the same manner as described in Example 1. Pellets were made according to the method described in Example 2.

Procedure

Standard procedures were followed to obtain the results shown in Tables 8 and 9. Specifically, Moisture Total: ASTM E871; Ash Content: ASTM D1102; Sulfur Content: ATSM D4239; Gross Caloric Value at Constant Volume: ASTM E711; Chlorine Content: ASTM D6721; Bulk Density: ASTM E873; Fines (Particles less than 0.32 cm (0.125 in): Twin Peaks Test CH-P-06; Durability Index: Kansas State Method; Sample above 3.8 cm (1.5 in): Twin Peaks Test CH-P-06; Maximum Length: Twin Peaks Test CH-P-06; Diameter, Range: Twin Peaks Test CH-P-05. The tumbling method used to arrive at the durability indices noted herein is known as the "Kansas State Method." See, for example, http://pelletheat.org/pdfs/StandardSpecificationWith-Copyright.pdf.

Results

The results are shown below in Tables 8 and 9:

TABLE 8

Corn Stover Pellets, Untreated

| | METHOD | UNITS | MOISTURE FREE | AS RECEIVED |
|---|---|---|---|---|
| Moisture Total | ASTM E871 | wt % | | 12.08 |
| Ash | ASTM D1102 | wt % | 4.13 | 3.63 |
| Sulfur | ASTM D4239 | wt % | 0.095 | 0.084 |
| Gross Cal. Value at Const. | ASTM E711 | Btu/lb (Btu/kg) | 8017 (17,638) | 7048 (15,506) |
| Chlorine | ASTM D6721 | mg/kg | 4218 | 3709 |
| Bulk Density | ASTM E873 | lbs/ft$^3$ (kg/m$^3$) | | 44.08 (706) |
| Fines <0.125 in (<0.32 cm) | TPT CH-P-06 | wt % | | 0.57 |
| Durability Index | Kansas State | PDI | | 97.9 |
| Sample >1.5 in (3.8 cm) | TPT CH-P-06 | wt % | | 4 |

TABLE 8-continued

Corn Stover Pellets, Untreated

| | METHOD | UNITS | MOISTURE FREE | AS RECEIVED |
|---|---|---|---|---|
| Maximum Length (Single Pellet) | TPT CH-P-06 | in (cm) | | 1.6 (4.1) |
| Diameter, Range | TPT CH-P-05 | in (cm) | | 0.235-0.241 (0.597-0.612) |
| Diameter, Average | TPT CH-P-05 | in (cm) | | 0.239 (0.607) |
| Bag Weight | | lbs (kg) | | 3.5 (1.6) |

TABLE 9

Corn Stover Pellets, AFEX

| | METHOD | UNITS | MOISTURE FREE | AS RECEIVED |
|---|---|---|---|---|
| Moisture Total | ASTM E871 | wt % | | 7.39 |
| Ash | ASTM D1102 | wt % | 4.03 | 3.73 |
| Sulfur | ASTM D4239 | wt % | 0.087 | 0.08 |
| Gross Cal. Value at Const. | ASTM E711 | Btu/lb (Btu/kg) | 7977 (17,550) | 7388 (16,254) |
| Chlorine | ASTM D6721 | mg/kg | 3484 | 3226 |
| Bulk Density | ASTM E873 | lbs/ft$^3$ (kg/m$^3$) | | 47.15 (765) |
| Fines <0.125 in (<0.32 cm) | TPT CH-P-06 | wt % | | 0.2 |
| Durability Index | Kansas State | PDI | | 97.9 |
| Sample >1.5 in (3.8 cm) | TPT CH-P-06 | wt % | | 3.9 |
| Maximum Length (Single Pellet) | TPT CH-P-06 | in (cm) | | 1.85 (4.7) |
| Diameter, Range | TPT CH-P-05 | in (cm) | | 0.232-0.242 (0.589-0.615) |
| Bag Weight | | lbs (kg) | | 3.5 (1.6) |

Conclusion

As the results in Tables 8 and 9 show, the AFEX pellet has an increased gross caloric value, i.e., an AFEX pellet burns about 4.8% more efficiently due to the presence of less moisture in the AFEX pellet as compared with an untreated pellet. Specifically, the caloric increase, non-AFEX to AFEX was calculated as follows: 7388 Btu/lb−7048 Btu/lb=340 Btu/lb (or 748 Btu/kg); therefore % increase, non AFEX to AFEX is (340 Btu/lb)/(7048 Btu/lb)*100%=4.8%. Additionally, bulk density increased by an average of seven (7)% and there is an approximately 65% reduction in the amount of fines (i.e., broken pieces having a diameter less than 0.125 cm) in an AFEX pellet beg weighing about 3.5 lb (1.6 kg) as compared with a pellet bag of untreated corn stover having approximately the same weight.

Additionally, although the "durability indices" between AFEX and non-AFEX pellets are substantially the same in this testing, the method of testing durability was a simple tumbling experiment ("Kansas State Method"), as compared with the destructive testing described in the above examples. As such, insufficient energy is provided to create the separation required to be able to properly distinguish between the pellets. Regardless, a high durability indice shows that the AFEX pellets are suitable for use in the pellet industry.

Example 7 (Prophetic)

Samples of biomass, such as switchgrass and prairie cord grass will be collected at various maturities, and corn stover will be collected following grain harvest. Biomass composition will be determined at harvest, during storage in round bales, after initial AFEX processing and densification, and after storage of densified pellets. AFEX pretreatment will be statistically optimized for hydrolysis and binding properties based on parameters of time, temperature, biomass moisture, and ammonia to biomass ratio. AFEX conditions providing at least 90% of glucan conversion and 80% xylan conversion will be used to prepare materials for densification.

Densification will be performed using any suitable method, including the methods used in Examples 2 and 3.

The resulting pellets will be subjected to various environmental conditions to simulate long-term storage, and then evaluated for flowability, compression strength, water solubility, water absorption, etc. Downstream processing characteristics will be evaluated using a standardized set of hydrolysis and fermentation conditions, including separate hydrolysis and fermentation (SHF) vs. simultaneous saccharification and fermentation (SSF). In one embodiment a comparison of these properties will be made between freshly prepared pellets (i.e., within about one (1) month), stored pellets and non-densified biomass.

Example 8 (Prophetic)

AFEX pretreatment of prairie cord grass will be statistically optimized for time, temperature, biomass moisture, and ammonia to biomass ratio. A fairly broad range of AFEX conditions gives similar hydrolysis results, giving us confidence that there are sets of pretreatment conditions that also enhance binding properties. AFEX conditions providing at least 90% of glucan conversion and 80% xylan conversion will be identified and used to prepare materials for densification. We will characterize these pretreated materials for surface properties using various methods developed in our lab (ESCA, Prussian blue staining, SEM), and will correlate those properties with the pellet density and durability.

Example 9 (Prophetic)

Ten (10) kilograms each of corn stover and switchgrass will be subjected to AFEX pretreatment. These materials will preferably be chopped and milled into 5 different particle sizes, ranging from 850 microns to 2.5 cm prior to receipt by the supplier.

A ten (10) kg sample of this species will be used to do a statistically-optimized AFEX study. The optimal AFEX treatment conditions identified providing at least 90% of glucan conversion to glucose and 80% xylan conversion to xylose will be identified. These conditions will be used to prepare a 10 kg batch of AFEX prairie cord grass, at the varied particle sizes.

It is estimated that each kilogram of AFEX biomass should produce approximately forty (40) of the approximately 2.54× 1.59×10.16 cm (about one (1)×0.625×four (4) in) "single-stroke" pellets. Therefore, for each biomass species, 80 AFEX-treated pellets of each of the five biomass particle size should be obtained, for a total of 400 pellets per feedstock to be tested for durability and suitability. These AFEX pretreated materials will also be evaluated for their surface properties using various methods (e.g., ESCA, Prussian blue staining, SEM), and correlate those properties with the pellet density.

Example 10 (Prophetic)

Operating variables will be investigated to optimize operating conditions for converting pretreated biomass into densified pellets. These variables include AFEX pretreatment conditions, moisture content, particle size, die temperature versus bond strength, rate of compaction versus quality of output, energy usage, existing surface chemistry and variations, compaction ratios and resultant density, and compacted package size and shape. Attrition and wear of mechanical components will also be assessed.

Example 11 (Prophetic)

Biomass pretreated using any known AFEX procedure or according to the procedure in Example 1 or with any other appropriate modification of an AFEX procedure will be densified using any suitable method, including the methods described in Examples 2 and 3.

The densified biomass will then be subjected to various environmental conditions, including temperature (25 to 40° C.), relative humidity (60 to 90%), consolidation stress (0 to 120 kPa), and storage time (0 to 6 mo). Following storage, physical characteristics will be evaluated as described below:

Flowability may be evaluated with a simple test in which a number of AFEX-pellets are placed in a container, such as the bed of a truck and tipped to about 45 degrees. A comparison with conventional pellets may be made by noting the time it takes for the pellets to flow out of the container.

Flowability will also be evaluated using Carr Indices. See ASTM D6393. 1999, *Standard test method for bulk solids characterization by Carr indices, ASTM Standards*, W. Conshohocken. Pa. Flowability is comprehensively defined as the ability of a material to flow un-abruptly under a given environmental condition. The flowability measurement is most often done by Carr Indices, by calculating the total flowability index and total floodability index. Can, R. L. Jr. 1965, *Evaluating flow properties of solids*, Chemical Engineering 72(3): 163-168.

A higher value to total flowability index and lower value to total floodability index will yield an ideal material with low or no flow problems. Another way to quantify flowability is by measuring the Jenike Shear Stress properties. See Jenike, A. W. 1964, *Storage and flow of Bulletin No.* 123, Utah Engineering station, Bulletin of University of Utah. Jenike's method will also be used to determine particle cohesion, yield locus, angle of internal friction, yield strength, and flow function, and particle size distribution. See ASTM D6128. 2000, *Standard Test Method for Shear Testing of Bulk Solids Using the Jenike Shear Cell, ASTM Standards*, W. Conshohocken. Pa., and ASAE 519.3. 2003, *Method of determining and expressing fineness of feed materials by sieving, ASAE Standards*. St Joseph, Miss.: ASABE.

Additionally, glucan, xylan, galactan, arabinan, mannan, lignin, ash and fiber levels will be evaluated to determine their effect on storage and flowability behavior. Furthermore, several other physical properties will be measured as indicators of poor flowability (i.e., particle size, particle shape, thermal properties, moisture properties, and color). See Selig, M, et al., 2008, *Enzymatic saccharification of lignocellulosic biomass, Technical report NREL/TP*-510-42629; Sluiter, A, B. Hames, R. Ruiz, C. Scarlata, J. Sluiter, and D. Templeton, 2008a, *Determination of ash in biomass, Technical report NREL/TP*-510-42622; Sluiter, A, B. Hames, R. Ruiz, C. Scarlata, J. Sluiter, D. Templeton, and D. Crocker. 2008b, *Determination of structural carbohydrates and lignin in biomass, Technical report NREL/TP*-510-42618.

Rheological material properties that affect the ability of biomass to be handled pre- and post-densification will be established. Such properties include, but are not limited to, bulk density, true density, compressibility, relaxation, springback, permeability, unconfined yield strength, and frictional qualities. These properties are a function of the feedstock particle size and distribution, shape factor, moisture condition, and consolidation pressure and time. Since commercial rheological testers are typically designed for use with small grains and fine powders; and consequently, do not accommodate particulate that is greater than ¼ inch in diameter, we will develop new measurement systems for characterizing larger feedstock particles. Systems include compaction and shear cells that can be scaled for various material sizes, integrated with commercial load frames, and operated over a range of consolidation pressures.

Data will be analyzed to determine conditions which lead to improved (or optimized) flowability, using formal statistical methods such as general linear models, regression, response surface analysis, multivariate analysis, and other techniques as appropriate. See Myers, H. R. 1986, *Classical and modern regression applications*, $2^{nd}$ edition. Duxbury publications, CA. USA. Draper, N. R., and Smith, H. 1998, *Applied Regression Analysis*, New York, N.Y.: John Wiley and Sons, Inc.

Example 12 (Prophetic)

The impact on downstream processing, such as feedstock pretreatment, densification, and storage on bioconversion efficiency from the integrated AFEX/densification process will be evaluated. Tests will be carried out using a standardized set of conditions for both enzymatic hydrolysis and microbial fermentation.

At least three types of biomass will be evaluated, namely corn stover, switchgrass, and prairie cord grass. For each of these feedstocks, samples of raw ground biomass, AFEX-pretreated biomass, and AFEX-pretreated and densified biomass (before and after storage) will be collected. Thus, 3×4=12 total biomass sample types will be evaluated. Separate hydrolysis and fermentation (SHF) will be evaluated. For saccharification, flasks will be incubated for 48 h at 50° C. and 250 rpm in an orbital shaker. Samples will be removed at 0, 2, 4, 6, 8, 18, 24, 30, 36, and 48 hr. Flasks will then be cooled to 30° C. and inoculated with 2 ml of a 12-18 h culture of a recombinant strain of *Saccharomyces cerevisiae* which possesses pentose-fermenting capabilities grown in a medium containing two (2) g/l glucose and two (2) g/l yeast extract. Flasks will be incubated for an additional 96 h at 30° C. and 150 rpm in an orbital shaker. Samples will be removed at 0, 3, 6, 9, 18, 24, 36, 48, 60, 72, 84, and 96 hr during fermentation.

Beyond comparing the three types of feedstocks and four pretreatment combinations, conversion methods, enzyme sources, and enzyme dosage will also be compared as outlined below. Therefore, the nominal enzyme dosage of 15 FPU Spezyme® CP and 64 pNPGU Novozyme® 188 per g glucan will be compared, with a more challenging dosage of one third those rates. A similar pair of enzyme dosages will be calculated for the extremophile enzyme source.

Separate hydrolysis and fermentation (SHF) will be evaluated. For saccharification, flasks will be incubated for 48 h at 50° C. and 250 rpm in an orbital shaker. Samples will be removed at 0, 2, 4, 6, 8, 18, 24, 30, 36, and 48 hr. Flasks will then be cooled to 30° C. and inoculated with 2 ml of a 12-18 h culture of a recombinant strain of *Saccharomyces cerevisiae* which possesses pentose-fermenting capabilities grown in a medium containing two (2) g/l glucose and two (2) g/l yeast extract. Flasks will be incubated for an additional 96 h at 30° C. and 150 rpm in an orbital shaker. Samples will be removed at 0, 3, 6, 9, 18, 24, 36, 48, 60, 72, 84, and 96 hr during fermentation.

Simultaneous saccharification and fermentation (SSF) will also be performed to evaluate conversion. The main difference will be that flasks will be dosed with enzyme and immediately inoculated with yeast as noted above, then incubated for 144 hr at 30° C. Samples will be removed at 0, 2, 4, 6, 8, 18, 24, 36, 48, 60, 72, 96, 120, and 144 hr. Enzyme and biomass loadings and other conditions will be identical to those listed above.

Additionally, both SHF and SSF, replicating the conditions listed above, except for the enzyme source. Crude enzyme preparations from lignocellulose degrading extremophiles isolated from the Homestake Mine in Lead, S. Dak., now known as the Deep Underground Science and Engineering Laboratory (DUSEL), will be used. See Bang, S., et al, 2008. Biofuels group NSF DUSEL project [abstract]. Homestake DUSEL Spring Workshop. Talk 10. p. 2. These enzymes will be added in appropriate amounts to achieve comparable enzyme dosages to those above.

Samples will be analyzed for carbohydrates, organic acids, and ethanol via HPLC using a Biorad® HPX 87H column and refractive index detector. As noted previously, the AFEX process does not produce inhibitors such as furfural and hydroxymethyl furfural, and thus it will not be necessary to measure these. During fermentation, yeast and/or bacterial populations will be measured by hemocytometer or plate counts using potato dextrose agar. Three replications of each saccharification/fermentation will be performed for each treatment. Parameters to be calculated will include rates and yields for both saccharification and fermentation. Results will be averaged and statistically analyzed.

Example 13 (Prophetic)

Techno-economic models will be developed for the AFEX and densification processes of the pretreatment and densification facility. These models will be constructed using material and energy balance data collected upon completion of the aforementioned objectives and the general principles of engineering design. Both capital and operating costs will be estimated by the techno-economic model for each process. The feedstock cost will be assigned a value reflective of an informed estimate of its delivered cost. Once the costs are modeled, optimization methods, such as linear programming, will be used to minimize overall costs and determine an optimum capacity for the pretreatment and densification center facilities. The minimum feasible scale will be determined to assess the efficacy of the process for distributed adoption.

A preliminary model of the AFEX process will be constructed to interface with the subsequent densification process. Specifically, AFEX will be modeled as either a batch or a continuous process, depending upon the origin of the collected data. The capital and operating costs associated with feeding the AFEX reactor will be included in the model. AFEX reactors will be sized to achieve the desired capacity of pretreated biomass. Heat will be generated in the reactor as ammonia dissolves in the water present in the biomass. Additional heat will be provided by saturated steam at moderate to high pressures, either by direct injection or by indirect contact Ammonia will be recovered by steam stripping the pretreated biomass using distillation. The bottom stage of the column will produce pretreated biomass that is relatively low in ammonia concentration.

The pretreated biomass may be dried in a rotary dryer prior to compaction in the densification process. Both the ammonia-rich distillate and the volatilized gas from the rotary dryer will be combined and re-pressurized for recycle to the AFEX reactor. The amount of ammonia recycle is expected to comprise in excess of 95% of the ammonia needed for pretreatment. The costs of biomass, fresh ammonia feed, steam, and electricity will reflect industry values at the time the techno-economic model is constructed. Capital costs will be based upon the cost of fabrication using materials of construction that are compatible with the ammonia-biomass mixtures. All cost inputs will be adjustable to enable a subsequent sensitivity analysis. This analysis will determine the variables which are likely to result in marked increases in the cost of pretreated biomass.

Subsequently the external costs for the pretreatment and densification (P&D) facility, including transportation, storage, and material handling will be determined The overall cost-to-benefit ratios for the proposed P&D systems will then be compared to a centralized pretreatment and processing alternative without densification in order to quantify system advantages. It is anticipated that some components, such as transportation costs and material loss, may favor the proposed distributed processing system due to reduced feedstock transportation distance. The additional processing required by the proposed distributed P&D system may increase operating and processing costs at that location, but replace similar processing costs at the centralized processing facility. Additionally, the uniformity and densification of the raw material may yield significant advantages for large-scale material handling, storage and production. Quantifying these potential advantages will be a key outcome of the proposed project.

These studies will optimize the AFEX process for both pretreatment and subsequent densification; develop and optimize the densification process for pellet formation; determine physical characteristics of pellets before and after storage; evaluate hydrolysis and fermentation of fresh and stored pellets; and conduct an in-depth economic and energy analysis of the process.

Techno-economic models will be developed for the AFEX and densification processes using data collected above. Delivered feedstock costs will be based on informed estimates. Optimization methods (e.g., linear programming) will be used to minimize overall costs and determine an optimum and minimum capacity for the pretreatment & densification facility. The analysis will then compare the regional biomass processing center (RBPC) versus traditional systems without combined pretreatment and densification.

Costs associated with pretreatment and densification of biomass in RBPC will be studied, including optimal and minimal scale of RBPCs; sensitivity analysis to elucidate the variables with greatest impact capital and operating costs; a comparison of decentralized and centralized systems; and a rationale to assist in facility location relative to main biorefinery.

Figure 6:
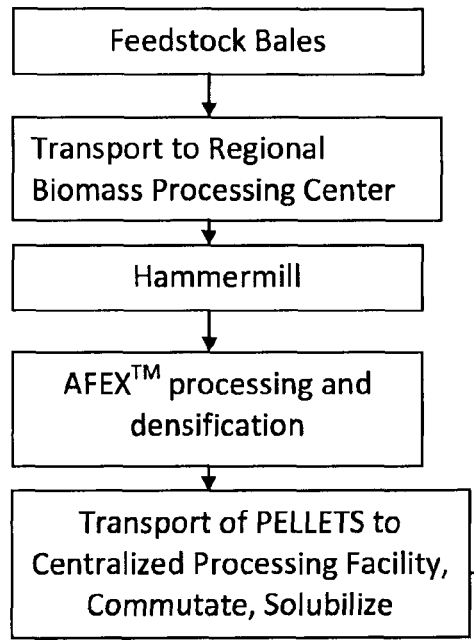
FIG. 6 is a flowchart showing a comparison of distributed and centralized processing models according to various embodiments.
Figure 6:
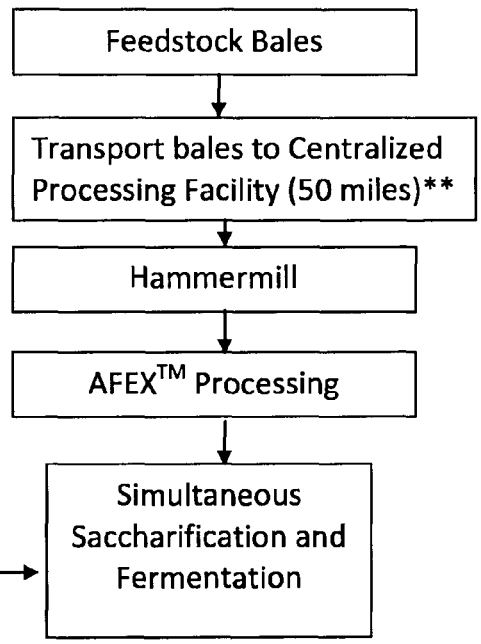
Figure 1:
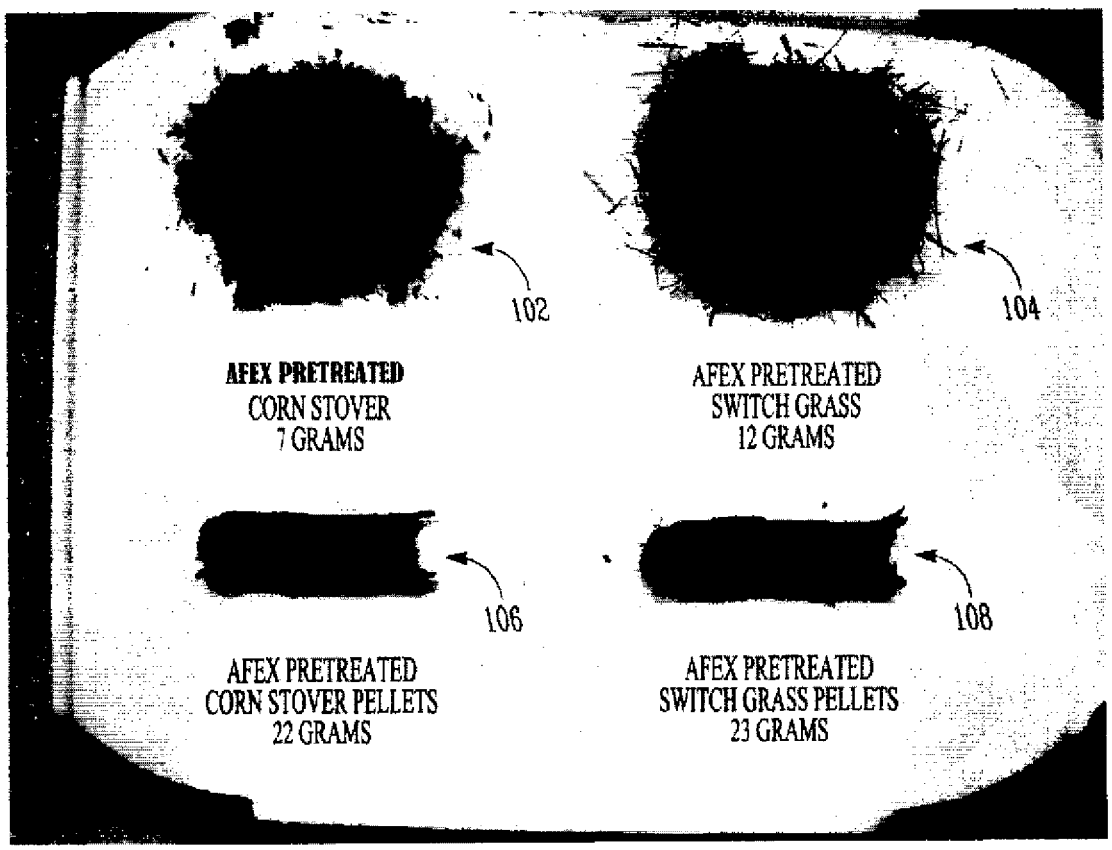
Figure 2:
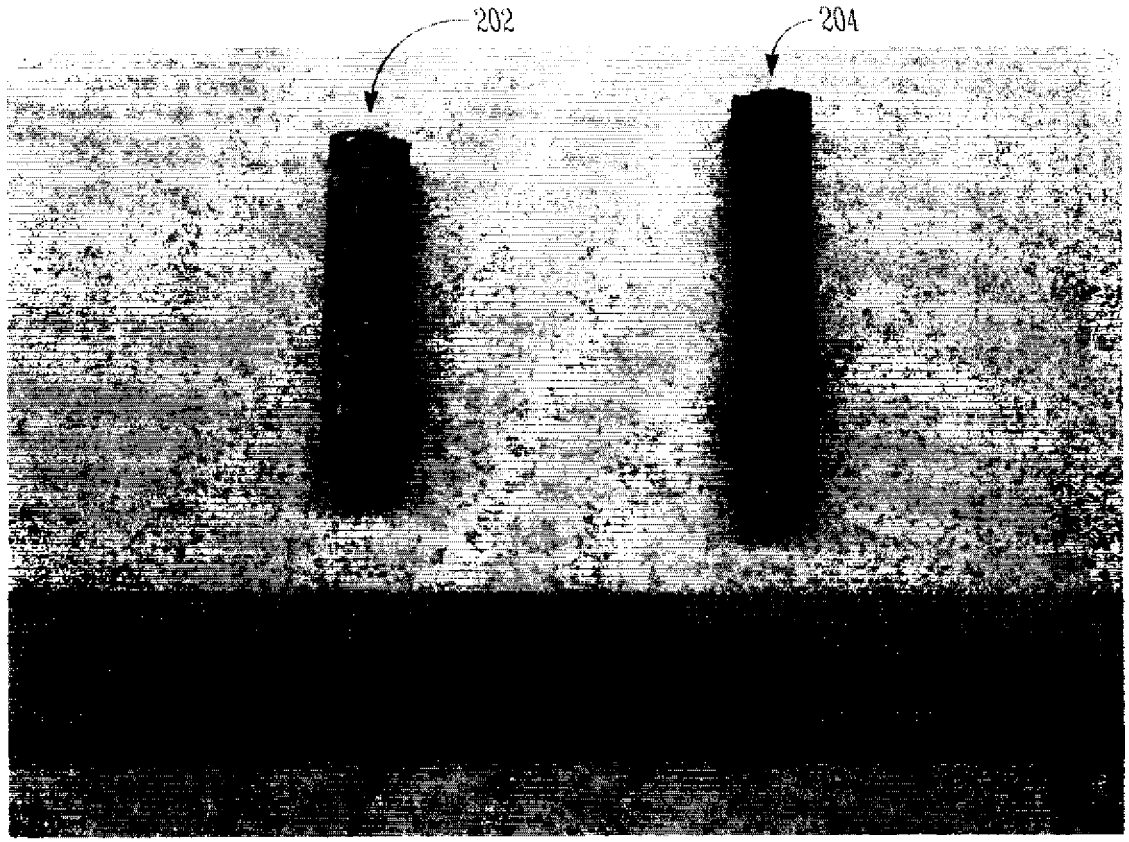
Figure 3A:
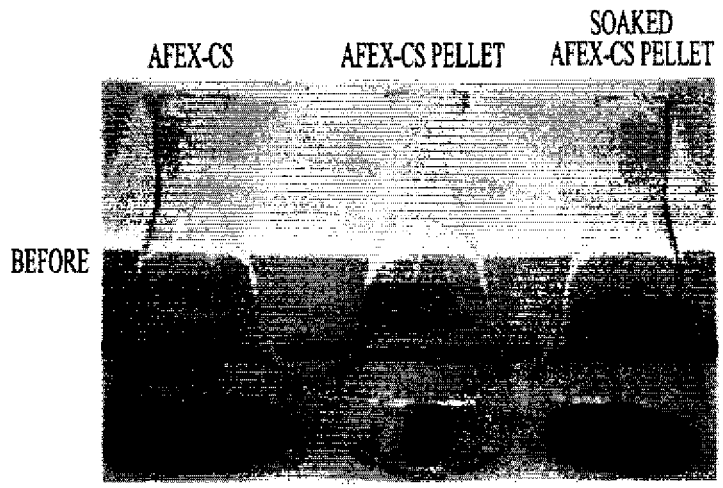
Figure 3B:
Figure 3C:
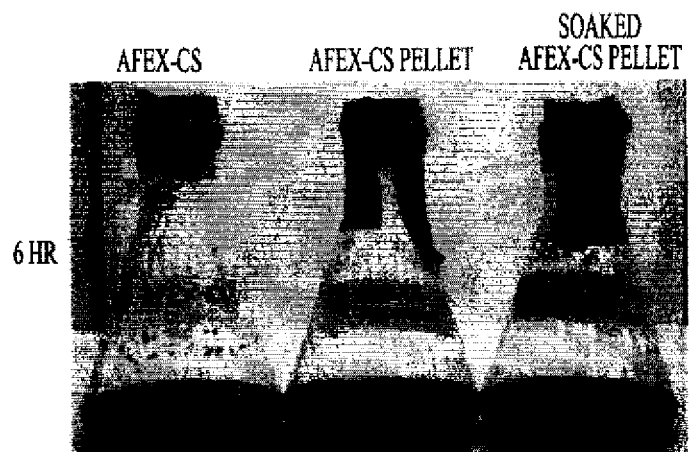
Figure 3D:
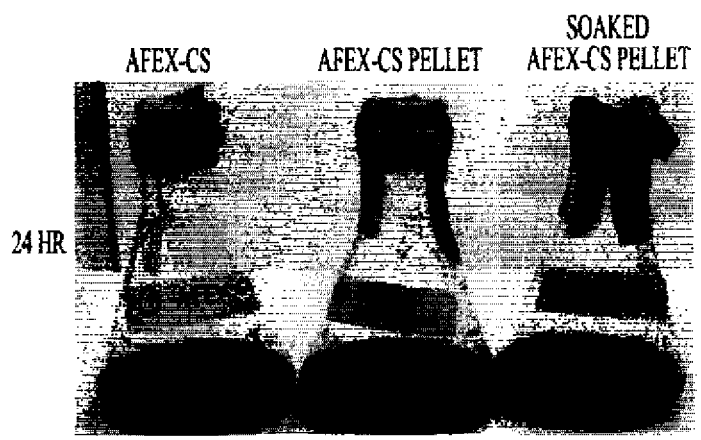
Figure 3E:
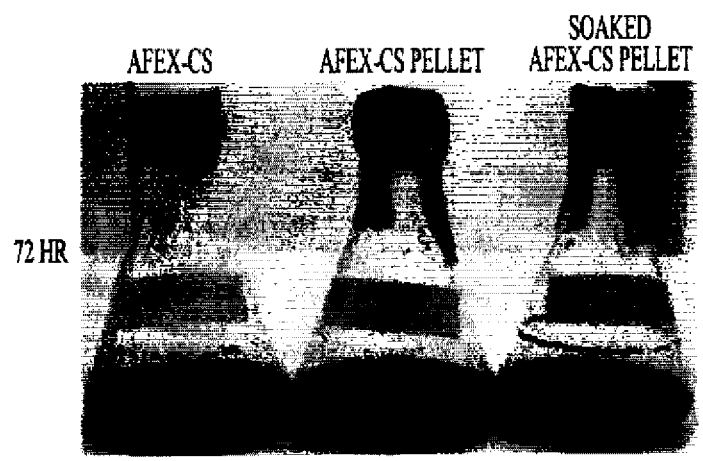
Figure 4:
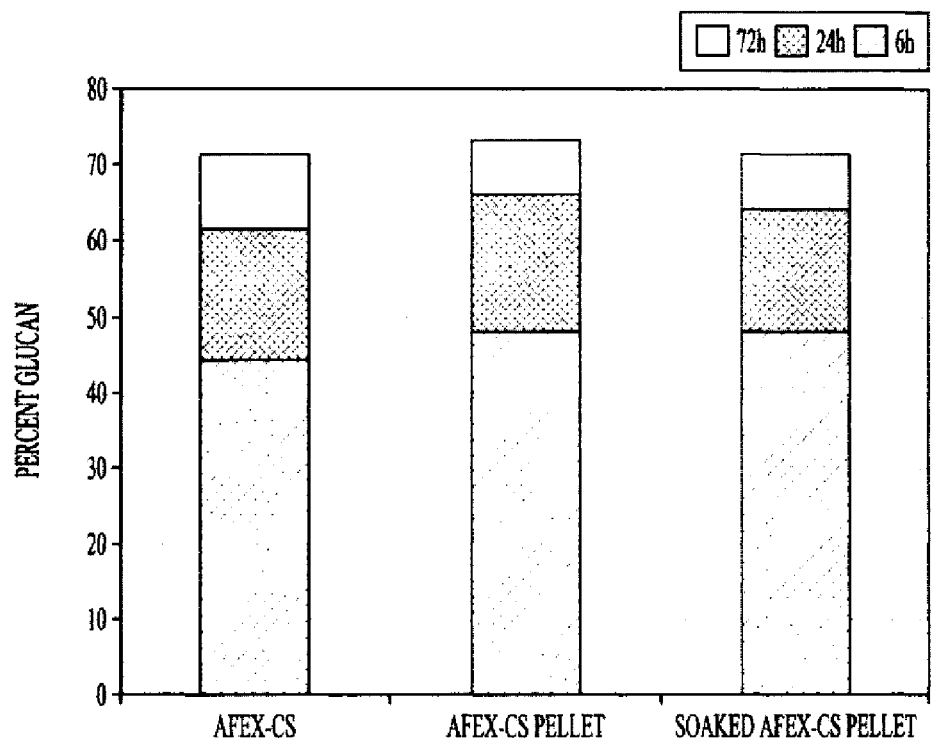
Figure 5:
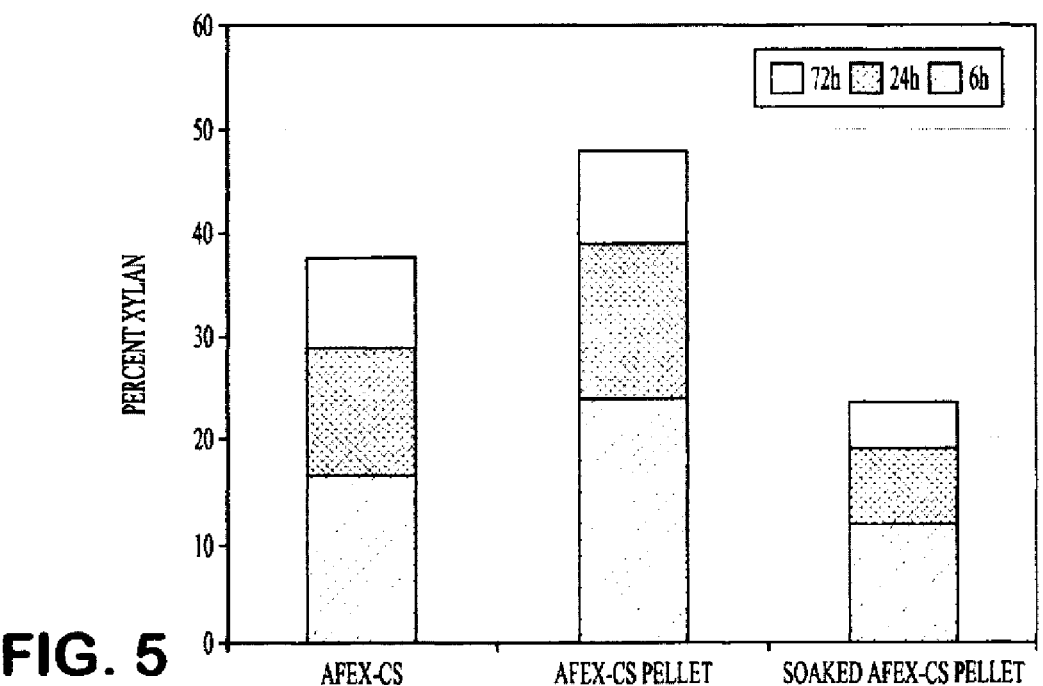
Figure 6:
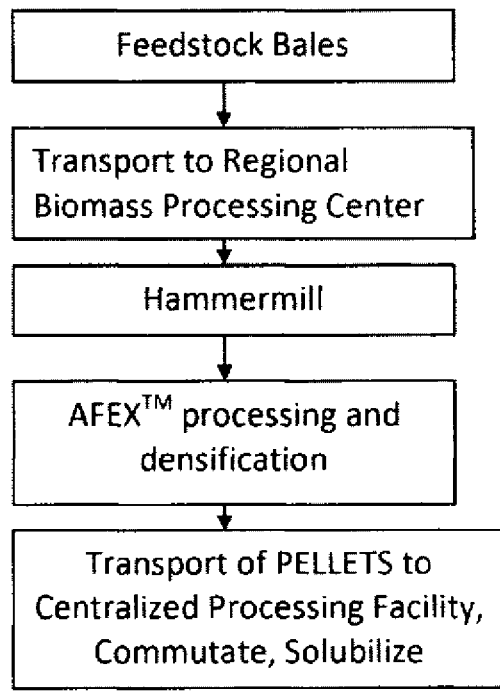
Figure 6:
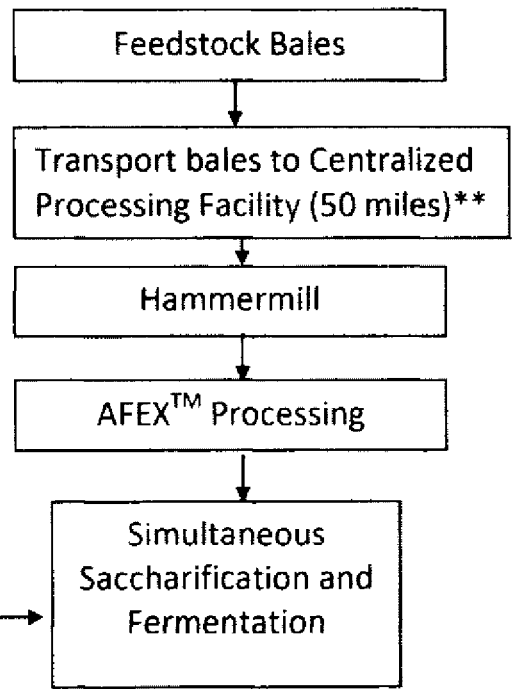

An economic model will be developed to provide decision-making capability to those adopting decentralized pretreatment and densification technology. See, for example, FIG. 6.

The logistics of harvesting, handling, transporting, and storing low bulk density feedstocks is a significant challenge to the bioeconomy. These issues are especially critical for herbaceous feedstocks, which may have low per-acre productivities. For example, biomass that yields 70 gallons of ethanol per ton, baled at a density of 120 Kg/m³ would require over 10 times the volume of material for a given volume of ethanol, compared with corn grain. Therefore, biomass densification at distributed locations (to minimize transport of feedstock bales) is critically needed, but conventional extrusion pelleting of untreated biomass has proven too costly.

Conclusion

Novel densified biomass products and methods for making and using same are described herein. In one embodiment, an AFEX pretreatment is used to produce a tacky biomass which, surprisingly, is easily convertible to a solid briquette or pellet without the use of additional binder. The AFEX pellets are also surprisingly at least as dense and demonstrate superior hardness properties as compared with conventional pellets containing added binders.

In one embodiment, pellets comprising more than one type of biomass material (e.g., corn stover, grasses, wood, and the like) is are provided. In this way, a commodity pelleted biomass product having relatively uniform properties which may be more easily adopted into the biomass processing industry, can be provided. Such properties may include, but are not limited to, BTU content, sugar content, and so forth.

Any suitable type of densification process may be used to produce products having a variety of sizes and shapes. In one embodiment, the densification process device uses a gear mesh system to compress biomass through a tapering channel between adjacent gear teeth, forming high density pellets. In one embodiment, the system operates at lower temperature, pressure, and energy requirements than comparable pelleting systems.

In one embodiment, the AFEX pellets "hold up" better, i.e., are more resistant to physical forces, than non-AFEX pellets during shipping, handling and/or storing. In one embodiment, the resulting products have an increased flowability as compared with conventional biomass solids, which allow for automated loading and unloading of transport vehicles and storage systems, as well as transport through the processing facility.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

Although specific embodiments have been illustrated and described herein, it will be appreciated by those of ordinary skill in the art that any procedure that is calculated to achieve the same purpose may be substituted for the specific embodiments shown. For example, although the process has been discussed using particular types of plant biomass, any type of plant biomass or other types of biomass or biofuels, such as agricultural biofuels, for example, may be used. This application is intended to cover any adaptations or variations of the present subject matter. Therefore, it is manifestly intended that embodiments of this invention be limited only by the claims and the equivalents thereof.

What is claimed is:

1. A product comprising:
at least one densified biomass particulate having no added binder and comprised of a plurality of plant biomass fibers completely coated with lignin, with at least some of the plurality of biomass fibers also coated with hemicellulose and containing trace amounts of ammonia, wherein the at least one densified biomass particulate has an intrinsic density substantially equivalent to a binder-containing densified biomass particulate and has a substantially smooth, non-flakey outer surface, further wherein the at least one densified biomass particulate has an increased resistance to deformation, an increased resistance to degradation, an improved shelf life, or a combination thereof, and is at least 21% harder with at least 20% less variability in hardness as compared to the binder-containing densified biomass particulate.

2. The product of claim 1 wherein the at least one densified biomass particulate having no added binder has a substantially rectangular shape or a substantially cylindrical shape.

3. The product of claim 1 wherein the plurality of biomass fibers are corn stover fibers, switchgrass fibers, prairie cord grass fibers, or combinations thereof.

4. The product of claim 1 wherein the at least one densified biomass particulate having no added binder is a plurality of densified biomass particulates of a given number, each having no added binder, wherein the plurality of densified biomass particulates has an increased flowability, a greater bulk density, or a combination thereof, as compared with a plurality of binder-containing densified biomass particulates of the same given number.

5. The product of claim 1 wherein the trace amounts of ammonia are from an ammonia pretreatment of the plurality of plant biomass fibers.

6. The product of claim 5 wherein the ammonia pretreatment is a liquid ammonia fiber expansion (AFEX) pretreatment or a gaseous AFEX pretreatment.

* * * * *

UNITED STATES PATENT AND TRADEMARK OFFICE
CERTIFICATE OF CORRECTION

PATENT NO. : 8,673,031 B2
APPLICATION NO. : 13/202011
DATED : March 18, 2014
INVENTOR(S) : Bruce E. Dale, Bryan Ritchie and Derek Marshall It is certified that error appears in the above-identified patent and that said Letters Patent is hereby corrected as shown below:

In the Specification

Pat. Col 10/Line 31: Error reads as "pellet and an AFEX-CS pellet." and should read as "pellet (202) and an AFEX-CS pellet (204)."
Pat. Col 10/Line 65: Error reads as "120 kg/m3 would 15 require" and should read as "120 kg/m$^3$ would require"
Pat. Col 11/Line 5: Error reads as "for 20 feedstock" and should read as "for feedstock"
Pat. Col 12/Line 45: Error reads as "be 82.1+g+7.9g+150g=240g" and should read as "82.1g+7.9g+150g=240g"
Pat. Col 12/Lines 48-49: Error reads as "by stiffing the" and should read as "by stirring the"
Pat. Col 19/Line 40: Error reads as "mm The" and should read as "mm. The"
Pat. Col 19/Line 41: Error read as "mm The" and should read as "mm. The"
Pat. Col 19/Line 45: Error reads as "mm" and should read as "mm."
Pat. Col 20/Line 17: Error reads as "briquettes was were" and should read as "briquettes were"
Pat. Col 23/Line 42: Error reads as "index. Can," and should read as "index. Carr,"
Pat. Col 23/Line 56: Error reads as "ASAE 519 3." and should read as "ASAE S19 3."
Pat. Col 24/Lines 45-56: DELETE selection "Separate...added." (Duplicate of text in Col 24/Line 65-Col 25/Line 9)
Pat. Col 24/Line 45: Immediately after the sentence that ends "...will be evaluated." INSERT --Conversion trials will be conducted in 500 ml Erlenmeyer flasks containing 48 dry g biomass and 152 ml of 2 M phosphate buffer (pH 4.3). The 24% solids loading rate was selected to simulate industrial conditions. Preliminary trials have shown that AFEX/densified pellets solubilize rapidly upon immersion in water, therefore grinding will not be necessary (See Example 2). At this point the pH should be 4.7-4.9, and will be adjusted to that level if necessary. To prevent bacterial contamination, 12 ml of a 10 mg/ml tetracycline stock solution will be added.--
Pat. Col 26/Line 22: Error reads as "be determined The" and should read as "be determined. The"
Pat. Col 27/Line 18: Error reads as "like) is are" and should read as "like) are"

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,673,031 B2
APPLICATION NO.    : 13/202011
DATED              : March 18, 2014
INVENTOR(S)        : Bruce E. Dale, Bryan Ritchie and Derek Marshall It is certified that error appears in the above-identified patent and that said Letters Patent is hereby corrected as shown below:

The Title page, showing the illustrative figure, should be deleted and substitute therefor the attached Title page Title Page, item (57), Abstract/Line 7: Error reads as "h a substantially" and should read as "a substantially"
Title Page, item (56),
Page 2/Other Publications/Col. 2/Line 1: Error reads as "Candian" and should read as "Canadian"
Page 2/Other Publications/Col. 2/Line 11: Error reads as "Sreial" and should read as "Serial"
Page 2/Other Publications/Col. 2/Line 14: Error reads as "gricultural" and should read as "agricultural"
Page 3/Other Publications/Col. 1/Line 9: Error reads as "Applciation" and should read as "Application"
Page 3/Other Publications/Col. 1/Line 35: Error reads as "hydrolosis" and should read as "hydrolysis"
Page 3/Other Publications/Col. 2/Line 30: Error reads as "Hemicelllulose" and should read as "Hemicellulose"
Page 3/Other Publications/Col. 2/Line 36: Error reads as "Sensitivty" and should read as "Sensitivity"
Page 4/Other Publications/Col. 1/Line 48: Error reads as "Peformance" and should read as "Performance"
Page 4/Other Publications/Col. 1/Line 62: Error reads as "Universiry" and should read as "University"
Page 4/Other Publications/Col. 1/Line 67: Error reads as "Accesibility" and should read as "Accessibility"
Page 4/Other Publications/Col. 2/Line 66: Error reads as "PCT1" and should read as "PCT/"

In the Drawings:
Please delete Drawing Sheets 1-5 and replace with Drawing Sheets 1-6 comprising, FIGS. 1, 2, 3A-3E, 4, 5 and 6

This certificate supersedes the Certificate of Correction issued November 11, 2014.

Signed and Sealed this
Eighth Day of September, 2015

Michelle K. Lee
*Director of the United States Patent and Trademark Office*

CERTIFICATE OF CORRECTION (continued)
U.S. Pat. No. 8,673,031 B2

In the Specification:

Pat. Col 4/Line 39-45: Error reads as "end products such as ethanol, iso-butanol, long chain alkanes etc. Pretreatment can reduce the degree of crystallinity of polymeric substrate, reduce the interference of lignin with biomass covnersion and by hydrolyzing some of the structural carbohydrates, thus increasing their enzymatic disgestibility and accelerating the degradation of biomass to useful products." and should read as "value added products such as ethanol."

Pat. Col 4/Line 47: Error reads as "and/or alkali such" and should read as "and/or other components such"

Pat. Col 4/Line 47-48: Error reads as "ammonium hydroxide, sodium hydroxide," and should read as "ammonium,"

Pat. Col 4/Line 53: Error reads as "the like. Most" and should read as "the like. Many"

Pat. Col 4/Line 53-54: Error reads as "cause the partial or full solubilzation and/or destabilization of lignin and/or" and should read as "cause"

Pat. Col 7/Line 17-18: Error reads as "expansion (explosion) method" and should read as "expansion method"

Pat. Col 7/Line 21: Error reads as "7,187,176 ('176)," and should read as "7,176,176 ('176)"

Pat. Col 10/Line 31: Error reads as "pellet and an AFEX-CS pellet." and should read as "pellet (202) and an AFEX-CS pellet (204)."

Pat. Col 10/Line 65: Error reads as "120 kg/m3 would 15 require" and should read as "120 kg/$m^3$ would require"

Pat. Col 11/Line 5: Error reads as "for 20 feedstock" and should read as "for feedstock"

Pat. Col 12/Line 45: Error reads as "be 82.1+g+7.9g+150g=240g" and should read as "82.1g+7.9g+150g=240g"

Pat. Col 12/Lines 48-49: Error reads as "by stiffing the" and should read as "by stirring the"

Pat. Col 19/Line 40: Error reads as "mm The" and should read as "mm. The"

Pat. Col 19/Line 41: Error read as "mm The" and should read as "mm. The"

Pat. Col 19/Line 45: Error reads as "mm" and should read as "mm."

Pat. Col 20/Line 17: Error reads as "briquettes was were" and should read as "briquettes were"

Pat. Col 23/Line 42: Error reads as "index. Can," and should read as "index. Carr,"

Pat. Col 23/Line 56: Error reads as "ASAE 519 3." and should read as "ASAE S19 3."

Pat. Col 24/Lines 45-56: DELETE selection "Separate...added." (Duplicate of text in Col 24/Line 65-Col 25/Line 9)

Pat. Col 24/Line 45: Immediately after the sentence that ends "...will be evaluated." INSERT --Conversion trials will be conducted in 500 ml Erlenmeyer flasks containing 48 dry g biomass and 152 ml of 2 M phosphate buffer (pH 4.3). The 24% solids loading rate was selected to simulate industrial conditions. Preliminary trials have shown that AFEX/densified pellets solubilize rapidly upon immersion in water, therefore grinding will not be necessary (See Example 2). At this point the pH should be 4.7-4.9, and will be adjusted to that level if necessary. To prevent bacterial contamination, 12 ml of a 10 mg/ml tetracycline stock solution will be added.--

Pat. Col 26/Line 22: Error reads as "be determined The" and should read as "be determined. The"

Pat. Col 27/Line 18: Error reads as "like) is are" and should read as "like) are"

(12) United States Patent
Dale et al.

(10) Patent No.: US 8,673,031 B2
(45) Date of Patent: Mar. 18, 2014

(54) PRETREATED DENSIFIED BIOMASS PRODUCTS

(75) Inventors: Bruce E. Dale, Mason, MI (US); Bryan Ritchie, Okemos, MI (US); Derek Marshall, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 5 days.

(21) Appl. No.: 13/202,011

(22) PCT Filed: Aug. 24, 2010

(86) PCT No.: PCT/US2010/046525
§ 371 (c)(1),
(2), (4) Date: Aug. 17, 2011

(87) PCT Pub. No.: WO2011/028543
PCT Pub. Date: Mar. 10, 2011

(65) Prior Publication Data
US 2011/0300269 A1 Dec. 8, 2011

Related U.S. Application Data

(60) Provisional application No. 61/236,403, filed on Aug. 24, 2009.

(51) Int. Cl.
*C10L 5/40* (2006.01)
*C10L 5/06* (2006.01)
*C10L 5/00* (2006.01)

(52) U.S. Cl.
USPC .................. 44/589; 44/593; 44/594; 44/595; 44/596; 44/605

(58) Field of Classification Search
CPC ............ C10L 5/44; C10L 5/445; Y02E 50/30; Y02E 50/10
USPC .................. 44/589, 593–596, 605
See application file for complete search history.

(56) References Cited

U.S. PATENT DOCUMENTS 4,064,276 A 12/1977 Conradsen et al.
4,263,744 A 4/1981 Stoller
4,370,351 A 1/1983 Harper
(Continued)

FOREIGN PATENT DOCUMENTS

AU 756976 11/2000
CA 2610797 A1 12/2006
(Continued)

OTHER PUBLICATIONS

International Application Serial No. PCT/US2010/046525, Preliminary Report on Patentability mailed Mar. 8, 2012.
(Continued)

*Primary Examiner* — Cephia D Toomer
(74) *Attorney, Agent, or Firm* — Clark IP Law, PLC

(57) ABSTRACT

A product comprising at least one densified biomass particulate of a given mass having no added binder and comprised of a plurality of lignin-coated plant biomass fibers is provided, wherein the at least one densified biomass particulate has an intrinsic density substantially equivalent to a binder-containing densified biomass particulate of the same given mass and h a substantially smooth, non-flakey outer surface. Methods for using and making the product are also described.

6 Claims, 6 Drawing Sheets

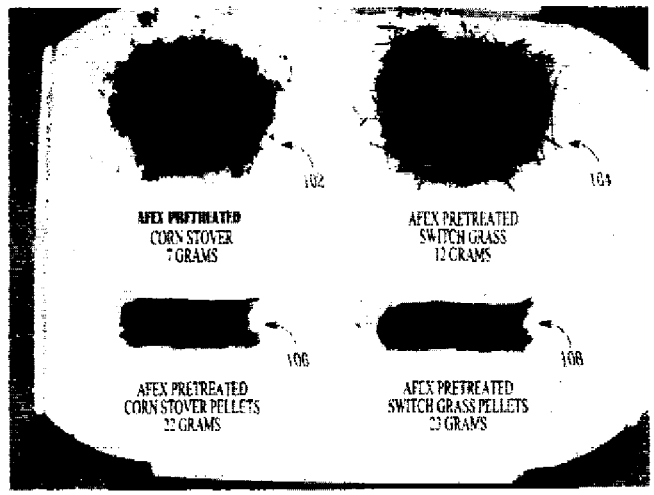

Distributed Processing Model

Centralized Processing Model

*8 to 16 km; **80.5 km